US011562306B2

(12) United States Patent
Li et al.

(10) Patent No.: US 11,562,306 B2
(45) Date of Patent: Jan. 24, 2023

(54) GEOLOCATION TRAJECTORY BASED GUEST RIDER DETERMINATION

(71) Applicant: Beijing DiDi Infinity Technology and Development Co., Ltd., Beijing (CN)

(72) Inventors: Zhendong Li, Burlingame, CA (US); Fangfei Ge, Mountain View, CA (US); Xin Chen, Sunnyvale, CA (US); Wentian Zhang, Beijing (CN); Yifang Yuan, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 0 days.

(21) Appl. No.: 17/149,054

(22) Filed: Jan. 14, 2021

(65) Prior Publication Data
US 2022/0222599 A1 Jul. 14, 2022

(51) Int. Cl.
G06Q 10/06 (2012.01)
(52) U.S. Cl.
CPC .............. G06Q 10/06311 (2013.01)
(58) Field of Classification Search
None
See application file for complete search history.

(56) References Cited

U.S. PATENT DOCUMENTS

| 10,264,389 B1 | 4/2019 | Hwang et al. |
| 2016/0364678 A1* | 12/2016 | Cao ..................... G06Q 10/083 |
| 2018/0059913 A1 | 3/2018 | Penilla et al. |
| 2018/0102017 A1 | 4/2018 | Brinig et al. |
| 2018/0211228 A1* | 7/2018 | Narayan ............. G06Q 10/1093 |
| 2018/0211542 A1* | 7/2018 | Narayan ................ G08G 1/202 |
| 2019/0172350 A1 | 6/2019 | O'Sullivan |
| 2020/0104962 A1* | 4/2020 | Aich ................. G06Q 10/06315 |

(Continued)

FOREIGN PATENT DOCUMENTS

KR 10-2013-0111787 A 10/2013

OTHER PUBLICATIONS

Geibel, 'Can you order a Lyft for someone else?': Yes, you can—here's how to do it in the Lyft app, https://www.businessinsider.com/can-you-order-a-lyft-for-someone-else, Sep. 5, 2019 (Year: 2019).*
(Continued)

Primary Examiner — Mohamed N El-Bathy
(74) Attorney, Agent, or Firm — Knobbe, Martens, Olson & Bear, LLP

(57) ABSTRACT

A ride-sharing system can automatically and autonomously determine whether a rider is an account holder associated with an account of a ride-sharing service that requested a ride or a guest rider. A guest rider detection system can use geolocation data to determine whether a rider is a guest rider or an account holder. The system can obtain location data for an account holder that requests a ride using a ride sharing application. The location data of the account holder can be compared with one or more locations (e.g., pickup or drop off location) associated with the requested ride. Based at least in part on the comparisons between the location data of the account holder and the one or more locations associated with the requested ride, the system can determine with a particular degree of certainty whether the rider is the guest rider or the account holder.

21 Claims, 8 Drawing Sheets

(56) References Cited

U.S. PATENT DOCUMENTS

| | | | |
|---|---|---|---|
| 2020/0104965 A1 | 4/2020 | Ramot et al. | |
| 2020/0193836 A1* | 6/2020 | Narayan | G08G 1/202 |
| 2020/0312063 A1* | 10/2020 | Balakrishnan | G08B 13/19697 |
| 2020/0349474 A1* | 11/2020 | Marueli | G06Q 50/01 |
| 2022/0003561 A1* | 1/2022 | Shoval | G01C 21/362 |

OTHER PUBLICATIONS

E. Syed et al, Cabtab—A Factual Analysis Concerned with Travelling Issues, Specifically for An Organization (Year: 2020).*

International Search Report and Written Opinion of International Application No. PCT/US2022/070073, dated Apr. 28, 2022 in 17 pages.

* cited by examiner

GEOLOCATION TRAJECTORY BASED GUEST RIDER DETERMINATION

INCORPORATION BY REFERENCE TO ANY PRIORITY APPLICATIONS

This application is being filed on Jan. 14, 2021, the same date as U.S. application Ser. No. 17/149,114, which is titled "MACHINE LEARNING BASED GEOLOCATION TRAJECTORY THRESHOLD DETERMINATION" and is hereby expressly incorporated by reference herein in its entirety for all purposes. Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

Some ride-sharing service users may schedule a ride on behalf of other users. The ride-sharing service user may be referred to as an "account holder" and the other user may be referred to as a "guest rider." For example, an account holder user may schedule a ride on behalf of a guest rider user that is a friend or family member of the account holder user. As another example, an account holder user may be associated with a business (e.g., a car repair shop) who schedules rides for one or more guest riders (e.g., customers of the car repair shop).

SUMMARY

Certain aspects of the present disclosure are directed to a ride-sharing system that can automatically and autonomously determine whether a rider is an account holder associated with an account of a ride-sharing service that requested the ride or is a guest user or guest rider. The system of the present disclosure can include a guest rider detection system or guest rider detector that can use geolocation data to determine whether a rider is a guest rider or an account holder. The system can obtain location data for an account holder that requests a ride using a ride sharing application. The location data can be obtained from a geolocation system of a wireless device of the account holder. The system can compare the location data of the account holder with one or more locations associated with the requested ride. The one or more locations compared to the location data can include a pickup location for the ride, a target or drop off location for the ride, and/or locations of the driver selected to perform the ride. Based at least in part on the comparisons between the location data of the account holder and the one or more locations associated with the requested ride, the system can determine with a particular degree of certainty whether the rider is the guest rider or the account holder.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Figure 1A:
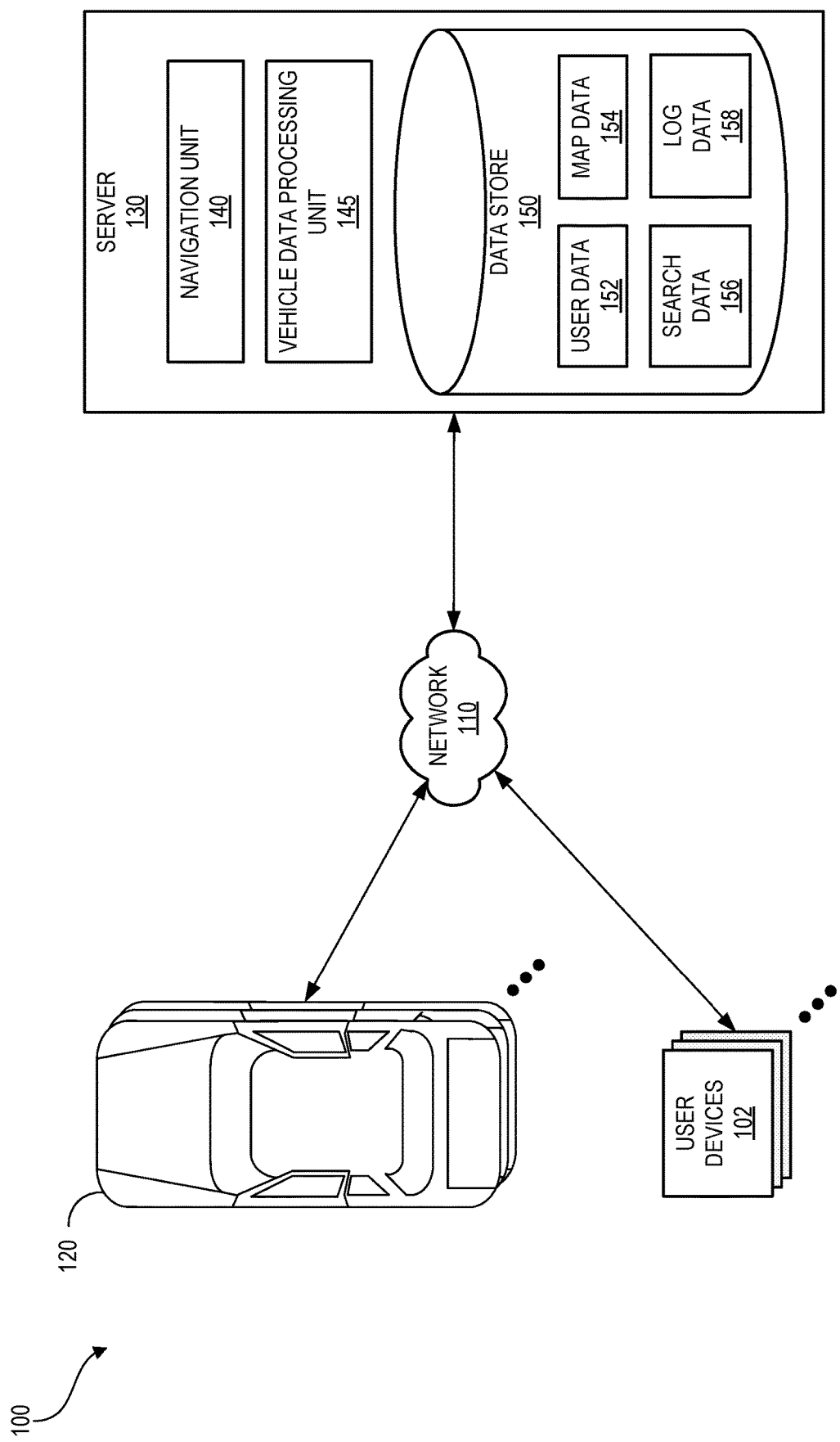
FIG. 1A illustrates a block diagram of a networked vehicle environment in which one or more vehicles and/or one or more user devices interact with a server via a network, according to certain aspects of the present disclosure.

A user associated with a ride-sharing account of a ride-sharing service may use the ride-sharing account to schedule or request a ride. To simplify discussion and not to limit the present disclosure, the user associated with the ride-sharing account may be referred to as an account holder or an account holder user. Another user may provide the ride to the account holder or the user requesting the ride who is associated with the ride-sharing account. To simplify discussion and not to limit the present disclosure, the user providing the ride may be referred to as a driver or driver user. As previously mentioned, in some cases the account holder user may request a ride on behalf of another user, or a second user, and/or the second user may use the account holder's ride-sharing account to request a ride with the ride-sharing service. To simplify discussion and not to limit the present disclosure, the second user may be referred to as a guest rider or guest rider user.

A guest rider may include a user or rider who makes use of a ride-sharing service, but is not the account holder whose account was used to schedule the ride using the ride-sharing service. Further, typically the guest rider rides without the account holder. In other words, the guest rider may not be a co-rider (e.g., friend, child, or other user) that is riding with the account holder.

It can be desirable to determine whether a rider is a guest rider. In some cases, a ride-sharing application may provide a guest rider alerting feature that enables a user to alert the ride-sharing service as to whether the rider is a guest rider. However, in other cases, the ride-sharing application may not include the guest rider alerting feature, or a user not user the guest rider alerting feature for any of a number of reasons (e.g., the user is malicious, the user is concerned with providing the information, or the user simply forgets, among other reasons). Thus, it is desirable to automatically determine whether a rider is a guest rider.

Determining whether a rider is a guest rider can be useful for determining whether to initiate some secondary action or process that may be omitted in cases where the rider is determined to be the account holder or not a guest rider. For example, it may be desirable to perform a fraud check process if the rider is determined to be a guest rider. As another example, it may be desirable to locate, assign, or request a particular type of driver (e.g., a driver of a particular sex or gender, a driver having an above threshold rating, or a driver with a below threshold number of complaints) when the rider is determined to be a guest rider. In some cases, the secondary action may be performed unless it is confirmed that the rider is the account holder. To simplify discussion and not to limit the present disclosure, the secondary action may be referred to as a guest rider action.

Systems and methods disclosed herein determine whether a rider who is using a ride-sharing service for a ride is an account holder or is a guest rider. The systems disclosed herein may determine whether the rider is a guest rider based at least in part on geolocation data for a wireless device associated with the account holder. The systems may obtain the geolocation data from the wireless device and compare it to one or more locations associated with the requested ride and/or with a location of a driver that is designated (either by self-selection or assignment) to perform the ride. For example, the systems disclosed herein may determine that the rider is a guest rider when it is determined from geolocation data that a wireless device of the account holder is moving away from a pickup location where the driver is to pick up the rider at a point in time prior to the start of the ride. As another example, the systems disclosed herein may determine that the rider is a guest rider when it is determined from geolocation data that a wireless device of the account holder is located at a drop off location prior to the occurrence of the ride.

Detailed descriptions and examples of systems and methods according to one or more illustrative embodiments of the present disclosure may be found, at least, in the section entitled Geolocation Based Guest Rider Detection, as well as in the section entitled Example Embodiments, and also in FIGS. 2-7 herein. Furthermore, components and functionality for ride-share pooling with neighbors may be configured and/or incorporated into the networked vehicle environment 100 described herein in FIGS. 1A-1B.

Various embodiments described herein are intimately tied to, enabled by, and would not exist except for, vehicle and/or computer technology. For example, identifying and scheduling ride-share pool trips with automatically and autonomously identified connection users that are determined to share at least one location zone with a user as described herein in reference to various embodiments cannot reasonably be performed by humans alone, without the vehicle and/or computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to certain aspects of the present disclosure. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. A user device 102 can execute an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location").

The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
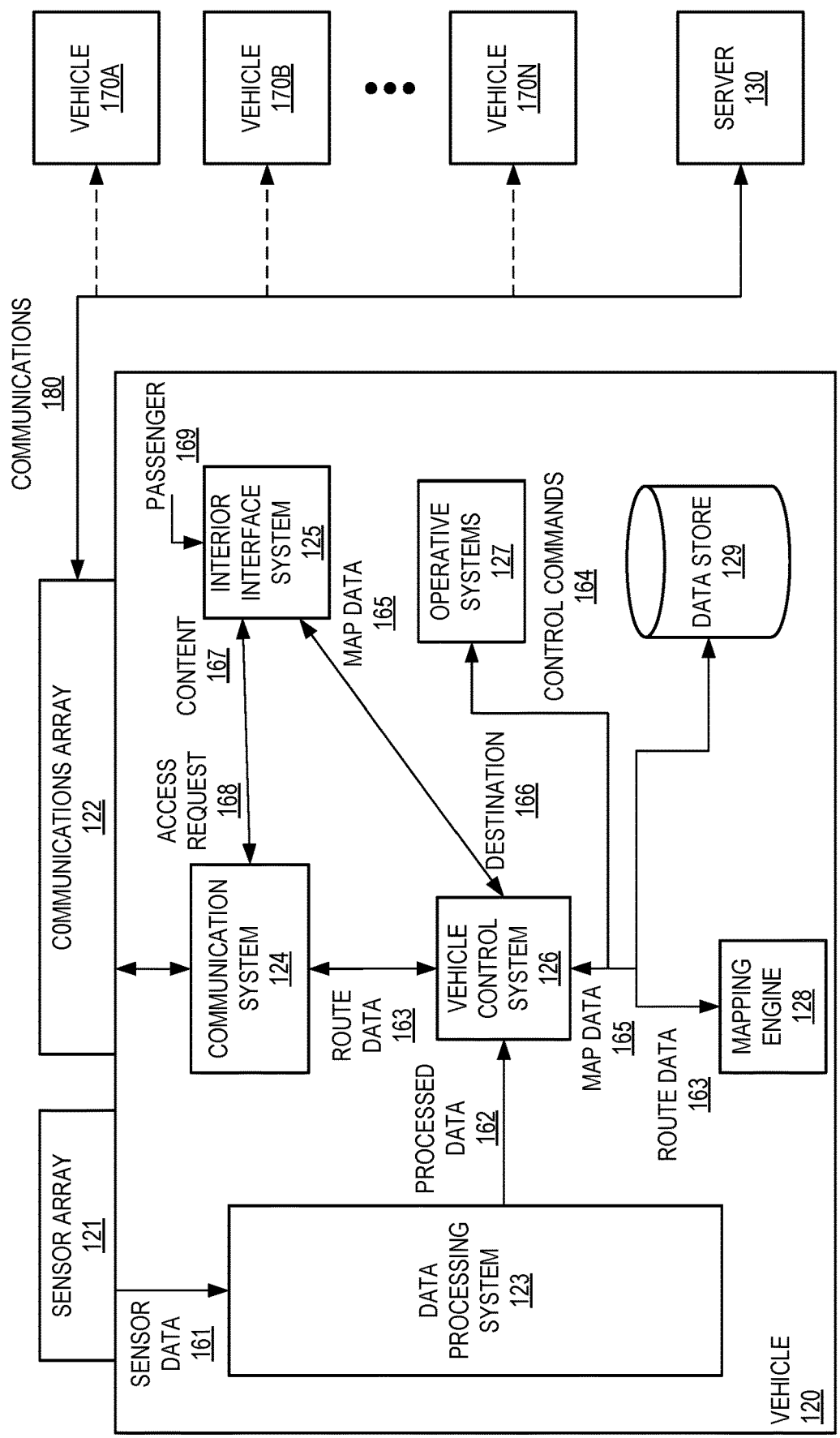
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A, 170B, . . . , 170N and/or the server 130 of FIG. 1A, according to certain aspects of the present disclosure. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Geolocation Based Guest Rider Detection

As previously described, it can be beneficial for a ride-sharing service to determine whether a ride is being scheduled for an account holder or for a guest rider. By determining whether a rider is a guest rider, it is possible to perform one or more actions, operations, or interventions that may improve safety for riders, drivers, or other users, and that may reduce fraud. These actions, operations, or interventions, which may be omitted when the rider is determined to be the account holder, may include one or more processes for selecting particular drivers, performing fraud detections, or monitoring rides, among other actions. As indicated above, and as described in more detail below, systems herein can determine whether a rider is an account holder or a guest rider by determining a location of the account holder relative to a requested ride path and/or a driver.

It should be understood that the guest rider determination is typically based on the location of the account holder because if the rider is not the account holder, there is typically not a way to know who the rider is unless it is self-declared by the rider or the account holder. However, in certain embodiments, it may be possible to detect a guest rider based on the location of the guest rider instead of or in addition to the location of the account holder. For example, if the guest rider also happens to be an account holder, the system may determine based on location data of the guest rider relative to the driver for the ride that the guest rider is in the vehicle.

Example Networked Computing Environment

Figure 2:
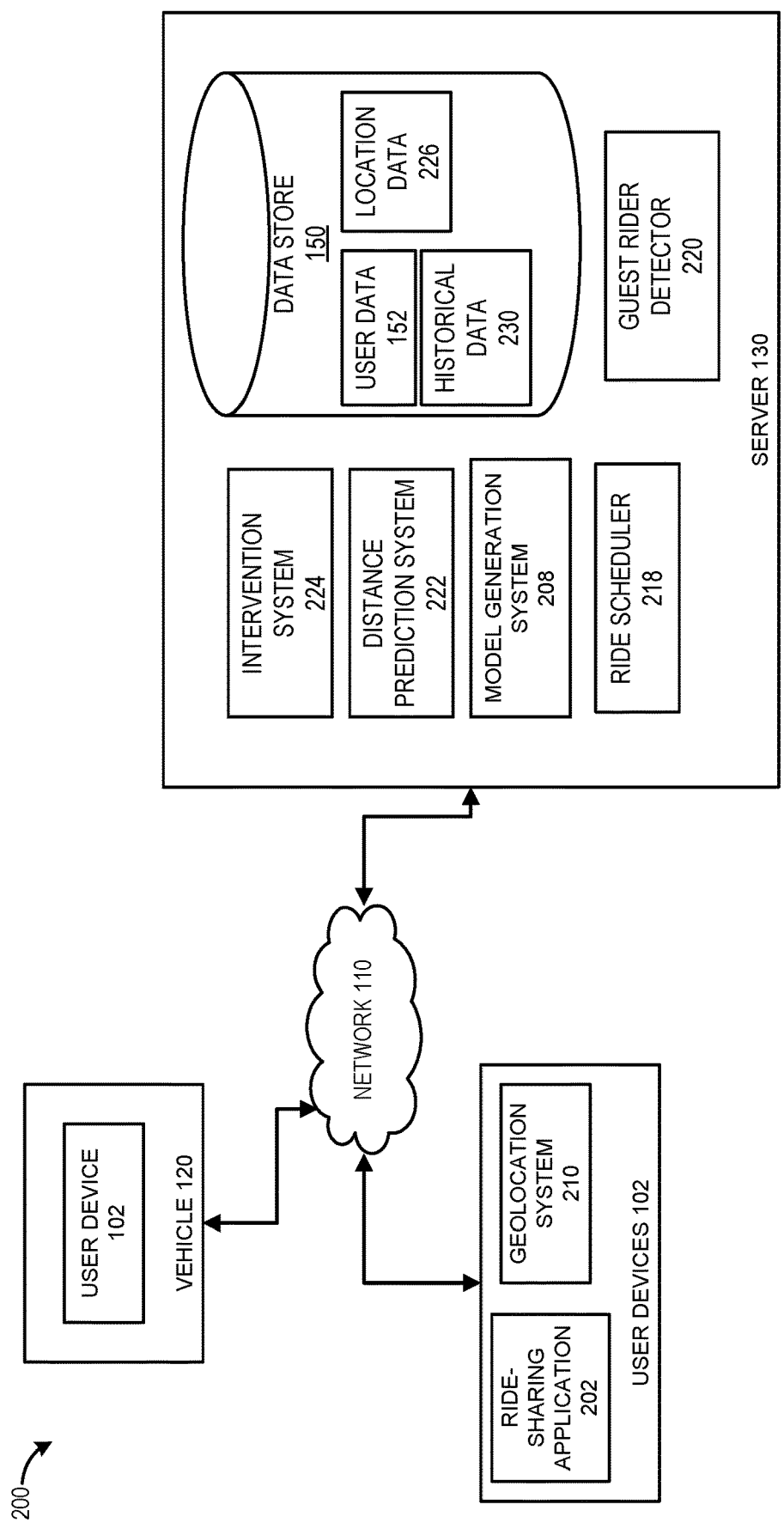
FIG. 2 illustrates a block diagram showing additional and/or alternative details of the networked vehicle environment of FIG. 1A in accordance with certain aspects of the present disclosure.

FIG. 2 illustrates a block diagram showing additional and/or alternative details of the networked vehicle environment of FIG. 1A in accordance with certain aspects of the present disclosure. The networked vehicle environment 200 may include one or more of the embodiments previously described with respect to the networked vehicle environment 100. Further, although not depicted by the networked vehicle environment 200, the networked vehicle environment 200 can include one or more of the systems of the networked vehicle environment 100, such as the vehicle 120 or the navigation unit 140.

The networked vehicle environment 200 may include one or more user devices 102. It should be understood that a user may have multiple user devices 102 and that there may be multiple users each with one or more user devices 102 as part of the networked vehicle environment 200. Further, a driver of the vehicle 120 may have a user device 102 as illustrated by the user device 102 depicted within the vehicle 120. In some cases, features of the user device 102 may be integrated into the vehicle 120. As previously described, the one or more user devices 102 can include any type of computing device, such as a smartphone, tablet, or laptop. In some cases, the one or more user devices 102 can include any type of computing device that can be used to request a ride using a ride-sharing application 202, which may be hosted at least in part by the one or more user devices 102. Although not depicted, it should be understood that the user device 102 included in the vehicle 120 may include one or more of the systems depicted with respect to the user device 102 external to the vehicle 120.

The ride-sharing application 202 can include any type of application that may be used to request or order a ride from one location to another location. Typically, the ride-sharing application 202 is used to request a car ride, but the ride-sharing application 202 is not limited as such and can be used to request rides on other types of vehicles, such as motorcycles, airplanes, helicopters, rickshaws, etc.

The user devices 102 may further include a geolocation system 210. The geolocation system 210 may include any system that facilitates determining a location of a user device 102. For example, the geolocation system 210 may include a global positioning system (GPS) receiver or GPS system. Further, the geolocation system 210 may include additional hardware and/or software that can determine a location of the user device 102 based at least in part on a signal received by the GPS receiver. In some embodiments, the geolocation system 210 may determine a location of the user device 102 using any other type of location system instead of or in addition to a GPS system. For example, the geolocation system 210 may determine the location of the user device 102 using triangulation with a cellular network and/or wireless routers.

Using the ride-sharing application 202, the user devices 102 may communicate with the server 130 to request a ride between two or more locations. The ride may be requested by a user who has an account with the ride-sharing service and this user may be referred to as an account holder. Further, the ride-sharing application 202 can be used to request a ride for another user who may or may not have an account with the ride-sharing service. In other words, a first user who has an account with the ride-sharing service may request a ride on behalf of a second user. This second user may or may not have an account with the ride-sharing service. Regardless of whether the second user has an account with the ride-sharing service, the ride-sharing service, or systems thereof, may not identify or be aware of the second user by virtue of the ride request being made by an account of the first user. However, using embodiments disclosed herein, it may be determined that the ride requested by the first user is for or taken by the second user, who may be referred to as a guest rider.

It should be understood that a ride-share as used herein may refer to a ride between two or more locations that is provided by a driver to a user. The term ride-share may be used to indicate that the driver is sharing use of his/her vehicle. A ride-share may include multiple users or passengers who typically are riding between the same two or more locations together. For example, the multiple users may be a family or a group of friends that intend to travel to the same target location. Further, while a rider may be a guest of an account holder and may ride with the account holder, generally the guest rider refers to a rider who travels with the account holder.

The server 130 may include a number of systems that facilitate determining whether a rider is an account holder or a guest rider of the account holder. Further, the server 130 may include a number of systems for perfuming one or more operations, interventions, or other actions based on whether the rider is determined to be an account holder, a guest rider, or an undetermined status. For instance, the systems of the server 130 may include a model generation system 208, a ride scheduler 218, a guest rider detector 220, a distance prediction system 222, an intervention systems 224, and the data store 150. The server 130 may further include the systems illustrated in FIG. 1A.

The ride scheduler 218 may include any system that is capable of scheduling a ride in response to a ride-share request. Scheduling the ride may include identifying a pickup location and a drop off location based on the ride-share request. Further, scheduling the ride may include identifying a rider to perform the ride. Identifying the driver may be based on a location of the driver, which may be determined from a detected location of a user device 102 of the driver and/or location in the vehicle 120. Further, identifying the driver may be based on the location of the driver relative to the pickup location of the rider. Further, as will be described in more detail below, in some cases the ride scheduler 218 may schedule a ride with a particular driver based at least in part on an identification of whether the rider is an account holder or guest rider.

The guest rider detector 220 may include any system that is capable of determining whether a rider that is taking a ride using a ride-sharing service is a guest rider. Alternatively, or in addition, the guest rider detector 220 may include any system that is capable of determining whether a rider that is taking a ride using a ride-sharing service is an account holder that requested the ride. The guest rider detector 220 may determine whether a rider is a guest rider by comparing one or more relative locations of the account holder associated with the account that scheduled the ride with one or more locations along the ride and/or with one or more locations of a driver selected to perform the ride. In some cases, the comparisons may be at particular times associated with the requested ride (e.g., at a scheduled ride start time or drop off time, etc.).

The distance prediction system 222 can include any system that can predict a threshold distance that can be used to determine whether a rider is an account holder or a guest rider. This threshold distance may be the distance between an account holder, and one or more locations along the ride and/or one or more locations of a driver selected to perform the ride that can be used to determine whether the account holder is the rider or a guest rider is the rider taking the scheduled or requested ride. For example, if the threshold distance is determined to be 0.25 miles, when the account holder is determined to be more than 0.25 miles from a particular location (e.g., a pickup location or the location of the ride-share driver less than ten minutes before scheduled ride start time), it may be determined that the ride is or is likely to be a guest rider. Conversely, when the account holder is determined to be less than 0.25 miles from the particular location, it may be determined that the rider is or is likely to be the account holder. As is described in more detail below, the threshold distance may vary based on the types of locations being compared (e.g., pickup location, drop off location, location during the ride, etc.). Further, in some cases, the threshold distance may vary based on ride characteristics determined for the requested ride. The ride characteristics may include any characteristic relating to the ride, account holder, or likely rider that may affect a determination of an amount of distance between a likely rider and a location associated with the ride or driver. For example, the ride characteristics may include a day, a time of day, a traffic pattern of a geographic location, a walkability score of the geographic location, one or more account holder demographics, a crime rate of the geographic location, or a cultural characteristic associated with peoples residing in the geographic location. For example, a rider or the average rider may be willing to walk a greater distance to a pickup location during the day than at night or in a particular zip code compared to another zip code, etc. As another example, a rider or the average rider residing in a particular area, country, geopolitical zone, and the like, may on average be more willing to walk further than riders from another area. This difference in willing walking distance may be based on the culture of people who live in a particular area, the safety of the particular area, the age of the average person living in the particular area, the layout of the particular area, the average traffic in the particular area, or based on any other consideration for how far the average person in a particular area may be willing to talk to or from a ride.

The distance prediction system 222 may predict the threshold distance using one or more machine learning models that can be used to predict the threshold distance based at least in part on the ride characteristics associated with the ride. Further, the one or more machine learning models may be generated using one or more machine learning algorithms. The machine learning models may be generated by the model generation system 208.

The intervention system 224 may include any system or set of systems that may perform one or more operations, actions, or interventions responsive to a determination or prediction of whether a rider is an account holder or a guest rider. Further, the intervention system 224 may or may not perform the one more actions when it is indeterminate whether the rider is the account holder or the guest rider. Moreover, as is described in more detail herein, the guest rider detector 220 may determine a type of guest rider. In some such cases, the operation, action, or intervention performed by the intervention system 224 may be based on the identified type of guest rider. The operation, action, or intervention may be any type of action that may be performed by a ride-sharing service when determining whether a rider is an account holder, guest rider, or indeterminate type of rider. For example, the action may be to perform a fraud detection operation with respect to the ride-sharing account of the account holder or a payment instrument used by the account holder. As another example, the action may be to select a particular type of driver, select a particular driver selection or identification process, or to modify a driver selection or identification process. For instance, when the rider is determined to not be the account holder, a driver of a particular gender may be selected, a driver with a particular minimum safety rating may be selected, and/or a driver who has performed a particular minimum or maximum number of rides within a particular time period may be selected. It should be understood that the aforementioned actions are non-limiting examples and other actions may be performed when a rider is determined to be a guest rider, not an account holder, an account holder, or of an indeterminate type. Moreover, the action performed may be based on the type of guest rider. For example, the fraud detection operation may be performed for agent guest riders, but not get or send guest riders.

Typically, but not necessarily, the type of guest rider may be defined with respect to the account holder. There may be any number of types of guest riders that can be defined by any type of rider characteristic and/or location relative to the account holder. For example, there may be three types of guest riders determined by the relative location of the account holder to the rider. These three types of guest riders may be referred to as a send guest rider, a get guest rider, and an agent guest rider. The send guest rider may refer to a guest rider who is initially at the same or nearby (e.g., less than a threshold distance away) location as the account holder. A get guest rider may refer to a guest rider who is initially more than a threshold distance away from the account holder and the drop off location of the requested ride is determined to be or is predicted to be at the same or nearby (e.g., less than a threshold distance away) location as the account holder.

An agent guest rider may refer to a guest rider who neither starts nor ends at or near a location of the account holder. Further, the agent guest rider may in some cases never meet with the account holder. The agent guest rider may be a guest rider who obtains a ride from a service provider account holder that may not be located at a location with the agent guest rider. For example, the agent guest rider may receive a guest ride from a mechanic service (e.g., because the guest rider's car is being repaired), from a restaurant or bar (e.g., to prevent drunk driving), from a store (e.g., to assist the guest rider with brining his or her purchases home), or from any other type of service that may use the ride-sharing service. It should be understood that in some cases, the guest rider who obtains a ride from a service provider (e.g., mechanic, store, restaurant or bar, etc.) may begin or end at the same location as the account holder. Thus, in some cases, the guest rider who obtains the ride from the service provider may be a get or send type guest rider. It should be understood that other types of guest riders are possible and/or that the type of guest rider may be determined based on other factors besides relative location to the account holder and/or driver. For example, the type of guest rider may be based on demographics (e.g., age or gender) of the guest rider. Moreover, the type of guest rider may be determined based on the type of location (e.g., school, club, alcohol drinking establishment, etc.) from which the guest rider begins the ride and/or the type of location at which the guest rider ends the ride.

The model generation system 208 may generate a prediction model using one or more machine learning algorithms. The machine learning algorithms may use historical data 230 to generate the prediction model. The historical data 230 may include any of the previously described user data 152. For example, the historical data 230 may include travel data, location data, harassment data, criminal or other complaint data, financial data, etc. Further, the historical data 230 may include ride characteristics associated with the rides included in the historical data 230. In addition, the historical data 230 may include reports, labels, and/or annotations regarding data included in the historical data 230 that indicate harassment, types of harassment, level of harassment, and any other information that may facilitate the identification of an occurrence of harassment or a likelihood of safety for a user obtaining a ride associated with particular ride characteristics.

As previously described, the data store 150 can store user data 152, which can include any type of data related to a user's use of the ride-sharing application 202. For example, the user data 152 may include usernames, passwords, names, addresses, billing information, data associated with prior trips taken or serviced by a user, user rating information, user loyalty program information, the types of services provided by the ride-sharing service that the user uses (e.g., ride-sharing pool services, luxury car requests, etc.), the frequency of services used by the user, and/or the like. Further, the data store 150 may store historical data 230 that may be used to generate or update a prediction model.

In addition, the data store 150 may include location data 226. The location data 226 may include mapping data for determining routes for a requested ride, routes between a location of an account holder and a location associated with a requested ride, and/or any other type of mapping data that may be used to help determine whether a rider is an account holder or a guest rider. Further, the location data 226 may include any other type of information associated with one or more locations that may be used to determine or predict whether a rider is a guest rider or account holder. For example, the location data 226 may include information about the types of residences, business, or other real estate that is located at or near particular locations. The determination of the type of real estate may be impact, for example, how far an account holder may be from a pickup location for a ride, thereby affecting thresholds used to determine or predict whether a rider is a guest rider. For example, certain locations, such as airports or shopping malls may have designated pickup and drop-off zones. These designated pickup and drop-off zones may affect how far a rider may walk to obtain a ride. Moreover, in some cases, the pickup and drop-off zones permissible at certain locations may differ, which may further impact threshold distance determinations by the distance prediction system 222 useable for determining or predicting whether a rider is a guest rider.

Example Model Generation System

Figure 3:
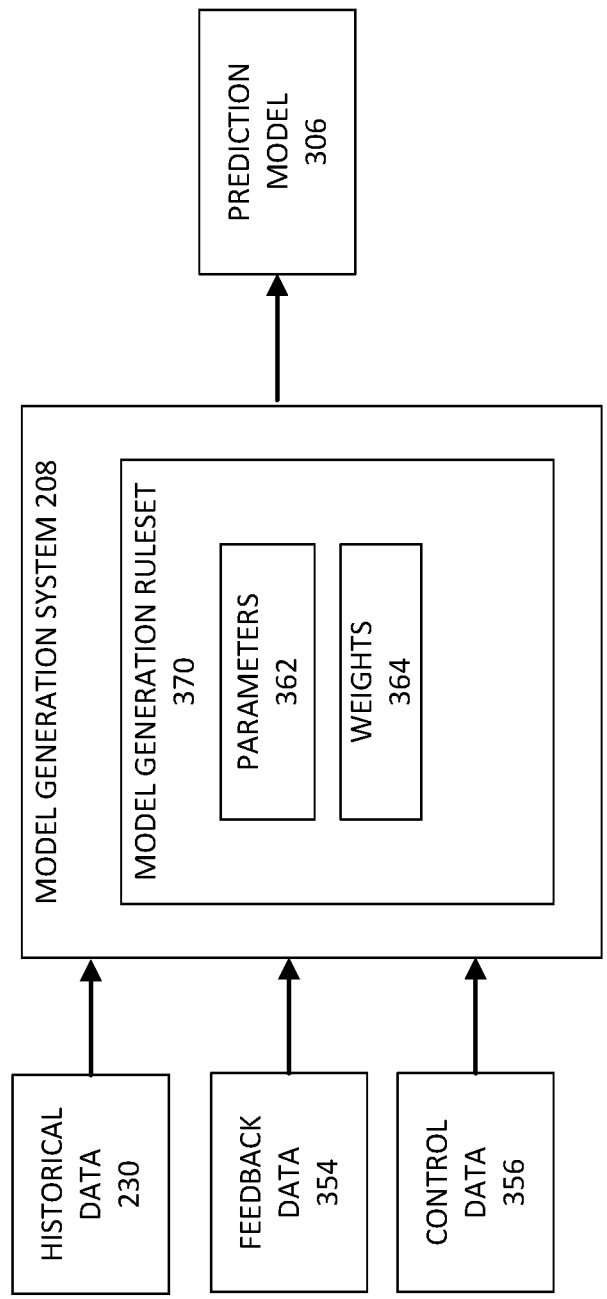
FIG. 3 illustrates a block diagram of a model generation system in accordance with certain aspects of the present disclosure.

FIG. 3 illustrates a block diagram of a model generation system 208 in accordance with certain aspects of the present disclosure. The model generation system 208 may be used to determine one or more prediction models 306 based on historical data 230 for a number of users, ride-sharing requests or orders, or ride-sharing events. Typically, although not necessarily, the historical data 230 includes data associated with a large number of ride-sharing requests, orders or ride-sharing events, such as hundreds, thousands, hundreds of thousands, or more orders. However, the present disclosure is not limited as such, and the number of ride-sharing events or orders may include any number. These orders or events may each be associated with unique ride-sharing events or drives and/or unique users. Further, at least some of the ride-sharing requests may be requests for rides on behalf of guest riders of one or more guest rider types. Further, at least some of the orders may be associated with the same driver, the same account holder and/or the same guest rider. For example, some account holders may regularly use their ride-sharing accounts with a ride-sharing service to request rides on behalf of one or more guest riders. The guest riders of an account holder may be the same (e.g., the account holder's son or daughter) for each requested ride or the guest riders may differ (e.g., customers of a particular service provider, such as a mechanic). Further, drivers may be associated with one order or multiple orders for rides.

The historical data 230 can include data received from one or more data sources, such as, for example one or more instances of the ride-sharing application 202, one or more customer service users, one or more employees of the ride-sharing service, one or more customer service systems, user devices 102, and/or one or more public data sources. Further, the historical data 230 can include data from different data sources, different data types, and any data generated during one or more orders and/or one or more safety reports generated by a customer service representative or customer service system of an entity associated with the ride-sharing application 202. The historical data 230 may generally include sets of real-world data, mapping or location data, and/or safety incident reports.

In some aspects, the historical data 230 may include a very large number of data points, such as millions of data points, which may be aggregated into one or more data sets. In some cases, the historical data 230 may be accessed from a data store 150. Further, in some instances, one or more subsets of the historical data 230 may be limited by a date restriction, such as, for example, limited to include only data from the last 6 months, data that is between 3-6 months old, or data less than a year old. Changing cities or geographic areas may result in different real estate at locations over time and/or different levels of safety at the locations over time. For example, increased lighting or police presence may result in a location becoming safer than it was in the past. These changes in real estate or safety, among others, may result in a change as to how far a user may be willing to walk to reach a pickup point or to walk after a drop-off. Limiting the training data to a particular time period may facilitate generating a prediction model 306 that reflects changes in how far users may walk over time in particular locations and therefore, affect the threshold distances used to determine or predict whether a rider is a guest rider.

The model generation system 208 may, in some cases, also receive feedback data 354. This data may be received as part of a supervised model generation process that enables a user, such as an administrator, to provide additional input to the model generation system 208 that may be used to facilitate generation of the prediction model 306. For example, if an anomaly exists in the historical data 230, the user may tag the anomalous data enabling the model generation system 208 to handle the tagged data differently, such as by applying a different weight to the data or excluding the data from the model generation process.

Further, the model generation system 208 may receive control data 356. This control data 356 may identify one or more features or characteristics for which the model generation system 208 is to determine a model. Further, in some cases, the control data 356 may indicate a value for the one or more features identified in the control data 356. For example, suppose the control data 356 indicates that a prediction model is to be generated using the historical data 230 to determine or predict a threshold distance that can be used to determine or predict whether a rider is an account holder or a guest rider. The determination of whether a rider is an account holder or a guest rider may be based at least in part on one or more ride characteristics and/or account holder characteristics, such as age, gender, economic class, time of day, date, types of real estate, stores, or services within a particular distance of a pickup or drop off location, amount of traffic at the pickup or drop off location and/or at the time of the ride, culture of predominant residents at the location, walkability or safety of the pickup or drop off location, and the like. The control data 356 may include data or labels corresponding to any of the aforementioned ride characteristics.

The model generation system 208 may generally include a model generation ruleset 370 for generation of the prediction model 306. The model generation ruleset 370 may include one or more parameters 362. Each set of parameters 362 may be combined using one or more mathematical functions to obtain a parameter function or prediction model 306. Further, one or more specific parameters may be weighted by the weights 364. In some cases, the parameter function or prediction model 306 may be obtained by combining a set of parameters with a respective set of weights 364. The prediction model 306 and/or the respective parameters 362 of the prediction models 306 may be derived during a training process based on particular input data, such as the historical data 230, the feedback data 354, and/or the control data 356, and defined output criteria, which may be included with the control data 356, used for training purposes. The model generation ruleset 370 can define the specific machine learning rules and/or algorithms the model generation system 208 uses to generate the model based on a defined objective function, such as determining a threshold distance between an account holder and a particular location (e.g., a pickup location, a drop off location, or a driver location) to determine or predict whether a rider is a guest rider. In some instances, initial parameters 362 and weights 364 can be manually provided during the initiation of the model generation process. The parameters 362 and weights 364 can be updated and modified during the model generation phase to generate the prediction model 306.

In some cases, the model generation ruleset 370 can indicate the type of machine learning algorithms to perform on the historical data 230. For example, to generate the prediction model 306, the model generation ruleset 370 may indicate that the model generation system 208 use a FastText algorithm, a deep learning algorithm (e.g., a convolutional neural network (CNN) or a Recurrent Neural Network (RNN)), linear regression, decision tree, a Bayesian algorithm (e.g., naïve Bayes or Bayesian Network), a clustering algorithm (e.g., K-Means or k-Medians), an association rule learning algorithm (e.g., Apriori algorithm or Eclat algorithm), an artificial neural network algorithm (e.g., perception, Hopfield Network, or Radial Basis Function Network), or a hierarchical attention network (HAN), and the like. Any type of machine learning algorithm may be used including an unsupervised learning, semi-supervised learning or supervised learning algorithm.

The model generation system 208 can filter and categorize the historical data 230 according to various characteristics and parameters of the data. For example, the data can be categorized by the data source (for example, data collected by the ride-sharing application 202, data collected from an external data source (e.g., public crime database), data collected from customer complaints or reviews, or data collected from any other source. As another example, the data may be categorized by type (e.g., location data, usage data, reviews data, financial data, criminal record data, etc.). The model generation system 208 can filter the information to identify subset of historical data 230 for further processing. In some embodiments, the model generation system 208 is configured to filter and separate the historical data 230 into a plurality of data types or categories before further processing. Moreover, in some cases, some of the historical data 230 may be filtered out or removed from the historical data 230 based on the data being associated with a relevance that does not satisfy a threshold relevance as determined by the model generation system 208. For example, if it is determined that gender does not impact threshold walking distance for determining whether a rider is a guest rider, gender information may be filtered from the historical data. As another example, if a new road was opened or an existing road recently expanded, traffic data in the historical data 230 may no longer be relevant and may be filtered from the historical data 230.

After the prediction model 306 has been generated, the model can be deployed or used during runtime of the distance prediction system 222 to determine or predict a threshold distance between an account holder and a particular location that is sufficient to indicate or predict with a particular degree of certainty whether a rider is the account holder or, for example, a guest rider. In some instances, the prediction model 306 generated based at least on the historical data 230 may be provided as an input to the model generation system 208. The prediction model 306 may then be modified based on additional training data received including, in some cases, more recent ride-sharing events, user data, and/or location data for one or more rides that do or do not include a guest rider than the data initially used as part of the historical data 230 to initially generate the prediction model 306. In other words, in some cases, the prediction model 306 can be modified or updated over time as more data is obtained.

Example Ride-Sharing Process

Figure 4:
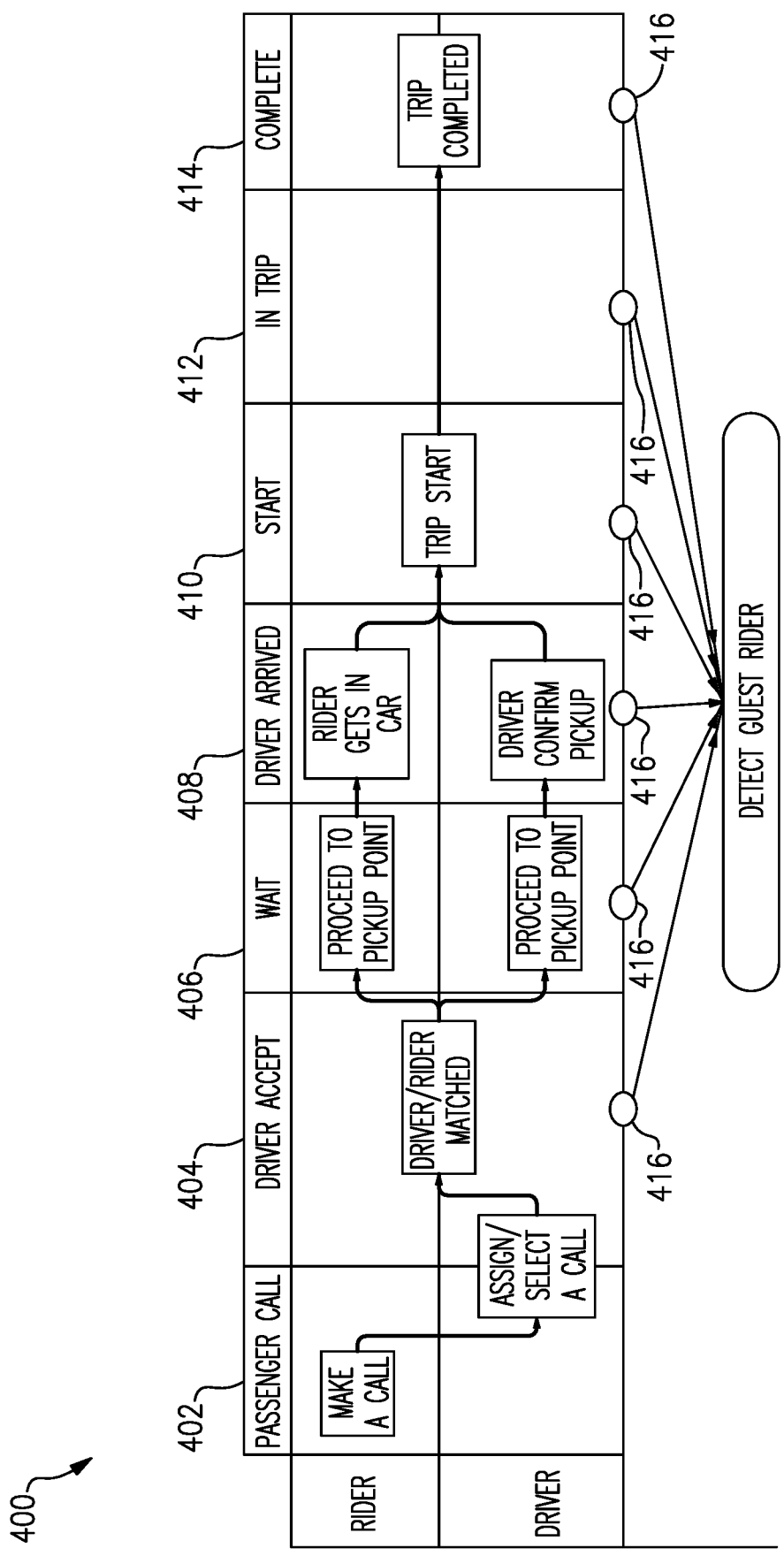
FIG. 4 illustrates a block diagram of a flow of a ride-sharing ride in accordance with certain aspects of the present disclosure.

FIG. 4 illustrates a block diagram of a flow of an example ride-sharing ride process 400 in accordance with certain aspects of the present disclosure. It should be understood that the process 400 is one non-limiting example process of a ride-sharing process that may be implemented by a ride-sharing service.

At stage 402, a user may request a ride-sharing ride. The ride-sharing ride request may be made via the ride-sharing application 202 hosted by a user device 102. Typically, the user is an account holder having a registered account with the ride-sharing service accessed via the ride-sharing application 202. However, the user may in some cases be a non-account holder who is using an account of an account holder to request the ride. In other words, the user may, for example, be a friend or family member borrowing access or otherwise using an account not registered to the user.

Between stage 402 and 404, a driver may be assigned the ride requested at the stage 402. Alternatively, or in addition, the driver may select or identify the requested ride from a set of one or more available ride requests that are available for a driver to service.

At stage 404, the driver and the user, who may or may not be the actual rider, are paired or matched together. The pairing may be performed by the ride scheduler 218. Pairing or matching the driver and the user may include sharing a pickup and/or drop off location of the user to the driver. Further, pairing or matching the driver and the user may include providing information about the driver to the user. This information may include rating information, name, current location, make and type of car, etc. In some cases, the user may have an opportunity to cancel the ride or request a different driver as part of the stage 404.

At stage 406, the rider, who may or may not be the account holder and/or the user that requested the ride, proceeds to the pickup location for the ride. It should be understood that in some cases the rider is at the pickup location when the ride request is generated. In such cases, the stage 406 with respect to the rider may be omitted. Further, at stage 406, the driver may proceed to the pickup point to pick up the rider for the requested ride.

At stage 408, the rider may get into the driver's car. This rider may be the account holder, or may be a guest rider. Further, the driver may confirm that he or she has picked up the rider from the pickup location.

At stage 410, the ride or trip starts according to the itinerary entered by the ride requestor. The trip may proceed along a path identified by the ride-sharing service and/or output by the ride-sharing application 202 on a display of a user device 102 of the driver. Alternatively, or in addition, the trip may proceed along a path identified or specified by the user and/or rider. In some cases, the trip may have multiple stops as part of the itinerary requested by the user. At stage 412, the ride or trip continues to progress until stage 414 is reached. At stage 414, the ride or trip is completed and the rider disembarks from the driver's vehicle at the drop off location.

During various stages of the ride-share trip process 400, the guest rider detector 220 may determine or predict with a particular degree of certainty whether the rider is the account holder associated with the account used to request the ride. If the guest rider detector 220 does not determine that the rider is the account holder, then the guest rider detector 220 may determine that the rider is a guest rider. The guest rider detector 220 may determine whether the rider is the account holder or guest rider by obtaining location information for the account holder, or for a user device 102 of the account holder. The user device 102 of the account holder may be determined based at least in part on the instance of the ride-sharing application 202 used to request the ride with the account holder's account with the ride-sharing service.

The location of the user device 102, and/or the account holder associated with (e.g., owns, borrowing, or otherwise using) the user device 102 may be determined from a geolocation system 210 of the user device 102. The guest rider detector 220 may determine the location of the account holder on an ongoing, periodic, or intermittent basis during various stages of the process 400. Obtaining or determining the location of the account holder is represented by the nodes 416 in the diagram of the process 400. Each node 416 may represent a single determination or a series of determinations of the location of the account holder at the corresponding stages of the process 400. For example, the guest rider detector 220 may first determine a location of the account holder at the stage 404 when the driver accepts or is matched with the rider for the requested ride. During each stage when the location of the account holder is determined, the guest rider detector 220 may use at least the account holder location to determine whether the rider, or prospective rider if at a stage in the process 400 prior to commencement of the trip, is a guest rider. As is described in more detail herein, the guest rider detector may determine whether the rider or prospective rider is the account holder or a guest rider by comparing the location of the account holder with a location of the driver, a pickup location, and/or a drop off location for the ride. Further, comparing the location may include comparing a change in location. In other words, the guest rider detector 220 may determine whether a rider is an account holder based at least in part on whether a distance between the account holder and a particular location is getting smaller or larger (e.g., is the account holder moving towards or away from the pickup location and/or the driver servicing the ride).

Advantageously, determining whether the rider is the account holder or the guest rider enables the intervention system 224 to perform or to initiate one or more actions or interventions that may improve service, improve safety, or reduce fraud. In some cases, the actions performed may depend on when it is confirmed (or predicted) that the rider is the account holder or guest rider and/or the type of guest rider determined or predicted. For example, if it is determined that the rider is a guest rider prior to the ride commencing (e.g., at the stage 404 or 406), a process may be initiated to change the driver. Changing the driver may occur, for example, responsive to safety concerns. For example, the intervention system 224 may determine by default that any guest rider is more susceptible to harm or safety concerns (whether or not that is true for the particular guest rider), and the driver may be changed to a driver with a higher safety rating or of a particular gender. In certain embodiments, by determining by default that a guest rider is more susceptible to harm, safety of the ride-sharing system can be improved compared to systems that do not modify driver assignments for guest riders. As another example, if it is determine that the rider is a guest rider, the intervention system 224 may initiate a fraud detection process to determine whether the account holder's account was fraudulently accessed or used.

Example Guest Rider Detection Process

Figure 5:
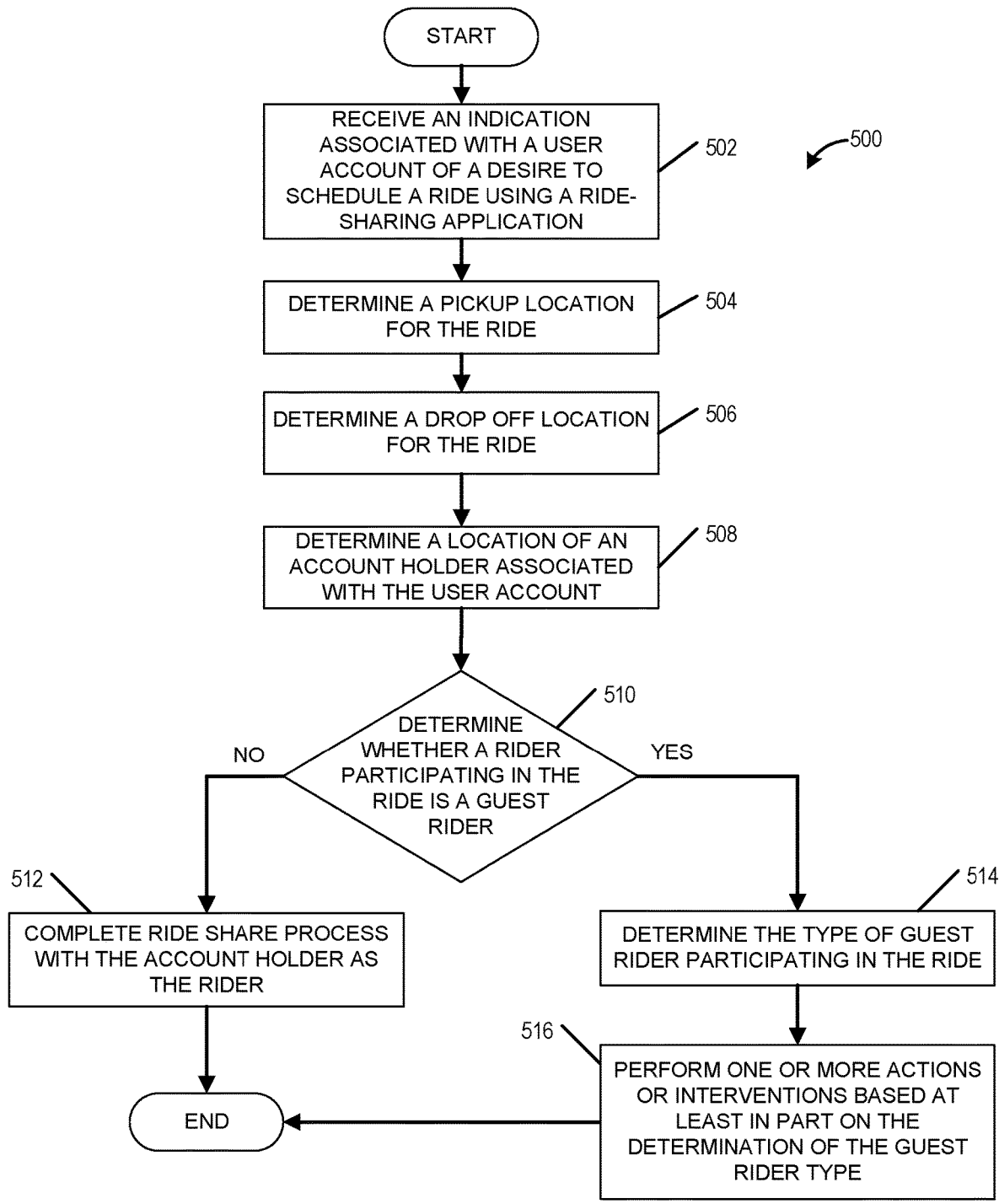
FIG. 5 presents a flowchart of an example guest rider detection process in accordance with certain embodiments.

FIG. 5 presents a flowchart of an example guest rider detection process 500 in accordance with certain embodiments. The process 500 can be implemented by any system that can identify, determine, or predict with a particular degree of certainty that a rider is a guest rider as opposed to an account holder whose account was used to request the ride for the rider. The process 500, in whole or in part, can be implemented by, for example, a server 130, a ride scheduler 218, a guest rider detector 220, a distance prediction system 222, an intervention system 224, a geolocation system 210, a user device 102, or a ride-sharing application 202, among others. Although any number of systems, in whole or in part, can implement the process 500, to simplify discussion, the process 500 will be described with respect to particular systems.

The process 500 may begin at block 502 where, for example, the ride scheduler 218 receives an indication or a request associated with a user account of a desire to schedule a ride using a ride-sharing service. This ride sharing service may be associated with a ride-sharing application 202 from which the ride scheduler 218 receives the indication. In some cases, the indication or request may identify whether the ride is for the account holder or a guest rider. However, often the request does not identify whether the rider is the account holder or a guest rider. Moreover, it is often desirable to use the processes herein to confirm whether the rider is a guest rider regardless of whether identified as such so as to account for mislabeling (intentional or otherwise) the status of the rider as the account holder or a guest rider. The indication or request received at the block 502 may be generated in response to a user interacting with the ride-sharing application 202 on a user device 102. Further, the user may be the account holder or a person using an account of the account holder.

At block 504, the ride scheduler 218 determines a pickup location for the ride. The pickup location for the ride may be determined based on the indication or ride request received at the block 502. Further, the pickup location may be specified by the user as part of the ride or ride-share request. Alternatively, or in addition, the ride-scheduler 218 may identify the pickup location based on the ride request. For example, if a user requests a ride from an airport or a shopping mall, the ride scheduler 218 may identify the pickup location based, for example, on agreements with the airport or shopping mall and/or local regulations.

At block 506, the ride scheduler 218 determines a drop off location for the ride. Similar to the pickup location, the drop off location may be determined based on the ride request received at the block 502. Further, the drop off location may be specified by the user as part of the ride or ride-share request. Alternatively, or in addition, the ride-scheduler 218 may identify the drop off location based on the ride request. For example, if a user requests a ride to an airport or a shopping mall, the ride scheduler 218 may identify the drop off location based, for example, on agreements with the airport or shopping mall and/or local regulations. In some cases, the block 506 may be performed multiple times. For example, a rider may change the drop off location at any point before the ride is completed.

At block 508, the guest rider detector 220 determines a location of an account holder associated with the user account. The location of the account holder may be determined based on a geolocation system 210 in the user device 102 of the account holder. In some cases, the guest rider detector 220 may ping or request the account holder location from the geolocation system 210 and/or the instance of the ride-sharing application 202 at the user device 102. In other cases, the ride-sharing application 202 may determine the location of the user device 102 and provide it to the guest rider detector 220. The locations determined at the blocks 504, 506, and/or 508 may be addresses, geographic coordinates, or any other type of location.

The guest rider detector 220 may determine the location of the account holder upon, or shortly after, the ride scheduler 218 receiving the ride-share request at the block 502. Alternatively, or in addition, the guest rider detector 220 may determine the location of the account holder at one or more additional times before, during, or at completion of the ride associated with the ride request. The account holder location may be determined continuously, intermittently, periodically, and/or at particular stages within the ride-share process. For example, the account holder location may be determined every five minutes. Alternatively, or in addition, the account holder location may be determined at a start and end of a ride. Further, the account holder location may be determined at each of the stages identified in FIG. 4.

At decision block 510, the guest rider detector 220 determines whether a rider participating in the ride is a guest rider. Determining whether the rider is a guest rider may comprise determining whether the rider is the account holder associated with the user account. If the rider is determined to not be the account holder, the rider may be assumed to be a guest rider at the decision block 510. Similarly, in some cases, if the guest rider detector 220 cannot determine whether or not the rider is the account holder (e.g., because the user device 102 was turned off, lost power, or lost connection to a cellular tower), the rider may be assumed to be a guest rider. Advantageously, by classifying indeterminate riders as guest riders, one or more actions associated with a guest rider may be performed. Similar to the identifying of the account holder location at the block 508, determining whether the rider is an account holder or a guest rider at decision block 510 may be performed once or multiple times. For example, the decision block may be performed each time the location of the account holder is determined, once at each stage of the ride share process, periodically during the ride share process, or at any other time during the ride share process. In cases where the decision block 510 is performed multiple times, performance of the decision block 510 may cease when it is determined with a particular degree of certainty whether the rider is the account holder or the guest rider.

Determining whether the rider is the account holder or the guest rider may include comparing the location of the account holder to one or more other locations associated with the ride. For example, the location of the account holder may be compared to the pickup location, the drop off location, and/or the location of the driver selected to service the ride request. The determination of whether the rider is the account holder or a guest rider may be based on comparing the location of the account holder and/or a difference between the location of the account holder and another location with a threshold distance. This threshold distance may be referred to as a guest rider threshold as the determination of whether the rider is the account holder or a guest rider may be based on a comparison to the threshold distance. The comparisons may occur at different times during the ride share process and different thresholds may be used to determine whether the rider is the account holder or the guest rider based on the stage of the ride share process.

In some cases, the guest rider detector 220 may determine that the rider is a guest rider when the location of the account holder exceeds the threshold distance from a pickup location and/or a driver at one or more of the stages 404, 406, 408, or 410. This difference in distance may occur when, for example, the account holder requests a ride for a guest rider at a pickup location where the account holder is not located. Further, the guest rider detector 220 may determine that the rider is a guest rider when the location of the account holder matches a location of the drop off location at one or more of the stages 404, 406, 408, or 410. This may occur when the account holder has arranged a ride to bring the guest rider to the account holder. In some cases, the guest rider detector 220 may determine that the rider is a guest rider when a difference between the location of the account holder and a location of the driver grows during the stages 410 and/or 412. This may occur, for example, when the account holder is with the guest rider at the pickup location, but does not join the ride with the guest rider.

In some cases, it is possible to pre-schedule a ride in advance of a desired ride time. For example, a user may schedule a ride a day before the ride is to occur. Thus, it should be understood that in some such cases both the determination of the account holder location and the determination of whether a rider is the account holder or a guest rider may not commence until a particular threshold time period prior to the start of the ride. The threshold time period may be based on the particular ride. Further, the comparison may be performed at particular times. For example, the determination of the account holder location and/or whether the rider is the account holder or the guest rider may begin 30 minutes, 15 minutes, or 5 minutes before the ride is scheduled to start and/or before the driver is expected to arrive at the pickup location.

If it is determined at the decision block 510 that the rider is not a guest rider, the ride scheduler 218 completes the ride share process with the account holder as, or identified as, the rider at block 512. Completing the ride share process with the account holder as the rider may include performing a traditional ride share process. Further, completing the ride share process with the account holder as the rider may include omitting or not performing one or more actions or interventions performed as part of the block 516 when the rider is determined to not be the account holder.

If it is determined at the decision block 510 that the rider is a guest rider, the guest rider detector 220 determines the type of guest rider participating in the ride at the block 514. In some embodiments, the block 514 may be optional or omitted. For example, in some cases, actions performed responsive to determination that a rider is a guest rider may be the same regardless of the type of guest rider.

Determining the type of guest rider may be based on where the account holder is located with respect to the guest rider. For example, there may be three types of guest riders: a send guest rider, a get guest rider, and an agent guest rider. A send guest rider may be a guest rider who starts at a location with the account holder when the ride is scheduled and/or when the rider is picked up, but only the guest rider takes the ride while the account holder does not join the ride. In other words, the account holder may send the guest rider to some location other than where the account holder is located. A get guest rider may be a guest rider who is not at the location of the account holder when the ride starts, but the ride may end at the location of the account holder. In other words, the account holder may being the guest rider from some location to a location where the guest rider is located. An agent guest rider may be a guest rider who is not at the location of the account holder at the start or end of the ride. In other words, the account holder is neither at the pickup or drop off location for a ride that includes an agent guest rider.

As previously explained, the guest rider detector 220 may determine different locations of the account holder or the location of the account holder at different times with respect to a ride. Further, these different locations may be compared with different distances and/or distance thresholds at different points in time with respect to the ride to determine the type of guest rider. Table 1 sets out different example distances that may be determined by the guest rider detector 220 with respect to the example process 400 to determine whether the rider is the account holder or a guest rider in accordance with certain non-limiting embodiments.

TABLE 1

| Distance Label | Definition |
| --- | --- |
| PAX_Distance_A | Distance between account holder and pickup location at stage 404 |
| PAX_Distance_B | Distance between account holder and pickup location at stage 406 |
| PAX_Distance_C | Distance between account holder and pickup location at stage 408 |
| DRV_Distance_C | Distance between driver and pickup location at stage 408 |
| Distance_C | Distance between account holder and driver at stage 408 |
| Distance_D | Distance between account holder and driver at stage 410 |
| Distance_E | One or more distances between account holder and driver at stage 412 obtained at different times during the trip |
| Distance_F | Distance between account holder and driver at stage 414 |
| PAX_Distance_F | Distance between account holder and drop off location at stage 414 |

The guest rider detector 220 may use some or all of the distances listed in Table 1 to determine whether a rider is, or is likely, the account holder or a guest rider. To make the determination, the guest rider detector 220 may apply the distances to one or more rules that can be used to determine whether the rider is the account holder or the guest rider. Further, the rules can be used to determine the type of guest rider. Table 2 sets out non-limiting example rules that can be used with respect to the different distances identified in Table 1 to determine a particular type of guest rider.

TABLE 2

| Guest Rider Type | Detection Rules |
| --- | --- |
| Send | (PAX_Distance_A < X) and ((PAX_Distance_C < X) |

TABLE 2-continued

| Guest Rider Type | Detection Rules |
|---|---|
| | or (Distance_D > Y) |
| | or (Distance_E > Y and indicates an increasing trend)) |
| | and (Distance_F > Z) |
| Get | (PAX_Distance_A > X) |
| | and (PAX_Distance_C > X) |
| | and ((Distance_D > Y) |
| | or (Distance_E > Y and indicates a decreasing trend)) |
| | and ((Distance_F < Z) |
| | or (PAX_Distance_F < Z)) |
| Agent | (PAX_Distance_A > X) |
| | and (PAX_Distance_B > X) |
| | and (PAX_Distance_C > X) |
| | and (Distance_D > X) |
| | and (Distance_E > X) |
| | and ((Distance_F > X) |
| | or (PAX_Distance_F > X)) |

Each of the rules of Table 2 may compare one or more distances with one or more threshold distances. These threshold distances may be referred to as guest rider thresholds. For example, the rules may include comparing one or more distances with the guest rider thresholds X, Y, and/or Z. These thresholds X, Y, or Z, may be specified in any unit of distance, such as feet, miles, yards, meters, kilometers, etc. Further, some of the thresholds may be measured in different units than others. Moreover, the rules may compare multiple distances against the same guest rider threshold, or against different guest rider thresholds.

It should be understood that the rules listed in Table 2 are non-limiting examples and that other rules are possible based on the data available to the guest rider detector 220 and the confidence level in the machine learning or prediction models used to predict whether a rider is a guest rider. Further, in some cases, not all of the example rules in Table 2 may be required to determine whether a rider is a guest rider or the type of guest rider. For example, the use of the rule Distance_F>Z in the Send guest rider type or the rule ((Distance_F<Z) or (PAX_Distance_F<Z)) in the Get guest rider type may be omitted or optional as the determination of the guest rider may be made based on the other rules. Other rules listed in Table 2 may also be optional or omitted. However, the use of multiple rules and/or the optional rules may be used to improve the confidence level of the determination of the status (e.g., account holder, guest rider, and/or type of guest rider) of the rider. Moreover, the use of multiple rules may be used to reduce or eliminate system or data errors relating to determining a location of the account holder and/or predicting the status of the rider.

At block 516, the intervention system 224 performs one or more actions or interventions based at least in part on the determination of the guest rider type. As mentioned above, in some cases, the block 514 may be optional or omitted. In such cases, the block 516 may perform one or more actions or interventions based at least in part on the determination that the rider is a guest rider regardless of the type of guest rider.

As can be seen from some of the example rules in Table 2, some rules cannot be applied until the ride is completed or near completion. However, it is often desirable to apply the one or more actions or interventions prior to completion of the ride. For example, it may be desirable to perform an action or intervention prior to final selection of a driver, prior to the rider getting into a vehicle, at the start of a ride, or at any other point during the ride-sharing process. Thus, in some such cases, a determination or prediction, or an initial determination or prediction of whether the rider is a guest rider and/or the type of guest rider may be made using a portion of the rules that can be applied prior to completion (e.g., at a start or in the middle) of the ride-sharing process. The intervention system 224 may perform one or more actions or interventions in response to the determination or prediction or the initial determination or prediction of whether the rider is a guest rider and/or the type of guest rider based on the portion of the rules that have been applied. In some cases, the process may complete after the initial determination. But, in some other such cases, the guest rider detector 220 may continue to determine or predict whether the rider is a guest rider or the type of guest rider throughout or at various stages of the ride-sharing process as more or updated data becomes available using, for example, the rules of Table 2. Based on the updated data and/or additional rules, the action or intervention previously initiated may cease, an additional action or intervention may be performed, or any other action may be performed relating to the determination of a guest rider status. Further, in some cases, the prediction model may be updated with the newly determined data. For example, if an initial prediction is determined to be incorrect based on the additional data, it may be desirable to update the prediction model 306 generated by the model generation system 208. Similarly, if the initial prediction is determined to be correct based on the additional data, it may be desirable to reinforce the accuracy of the prediction model 306 generated by the model generation system 208 by applying the additional data to the training data used to generate the prediction model 306.

The actions or interventions may include any type of additional or alternative action that may be desirable to perform when it is determined that a rider is not an account holder and/or is a guest rider. Further, the determination of whether to perform at least some of the actions may be based on the type of guest rider and/or the stage in the ride-share process 400 when it is determined that the rider is not an account holder and/or is a guest rider. Some non-limiting examples of actions or interventions that may be performed include: initiating a fraud detection process, selecting a driver associated with a threshold safety prediction level (which may be determined using a machine learning process), or selecting a driver with one or more driver characteristics (e.g., gender, years licensed, age of car, etc.).

As stated above, the actions may vary based on the type of guest rider. For example, in some cases, the fraud detection process may be used when the guest rider is determined to be an agent guest rider. The fraud detection process may include any type of process that may be used to confirm that the user using the account of the account holder is actually the account holder (or someone authorized by the account holder) and not someone who has maliciously accessed or accessed without authorization the account of the account holder. Alternatively, or in addition, the fraud detection process may be used to detect whether a payment instrument used to pay for the ride is fraudulently being accessed, or being accessed without authorization. In contrast, if the guest rider is determined to be a send or get guest rider, a driver selection process may be used to select a driver that is more likely to provide a sense of safety or less likely to harass the rider. For instance, a driver of a particular gender may be selected to service a guest rider. The particular gender may be selected based on a sense of safety the average rider may feel when the driver is of a particular gender regardless of whether there is improved safety. Alternatively, a driver with a particular rating may be selected. In some cases, the actions or interventions may be based on one or more additional factors besides guest rider status. For example, if it is determined that an instance of sexual harassment has occurred, the determination of whether the rider is a guest rider and/or the type of guest rider may be used by a customer service user and/or other entity (e.g., a police person) to react or act in response to the determination of an occurrence of sexual harassment. Further, in some cases, certain pre-boarding actions may be performed based on the type of guest rider. For example, the driver may be alerted with a warning message that the rider is not the account holder and/or a mandatory in-trip recording process may be triggered at the ride-sharing application 202 of the driver.

In certain embodiments, some or all of the process 500 may be repeated over time for the ride. For example, the location of the account holder may be obtained or updated over time at the block 508, and the decision block 510 and subsequent blocks may be repeated.

In some embodiments, upon determining that the rider is or is likely a guest rider, the guest rider detector 220 may alert the account that a guest rider is detected. This alert may be via the ride-sharing application 202 or any type of communication platform, such as via short message service (SMS) texts or multimedia messaging service (MMS) messages. The alert may be informational and/or may request confirmation from the account holder. In some cases, the account holder may be presented with an opportunity to request that the actions or interventions of the block 516 be performed or not be performed. Further, if the account holder disputes that the rider is a guest rider and instead indicates that the rider is the account holder, the process 500 may perform the operations associated with the block 512. In other cases, the process 500 may perform an action associated with the block 516 (e.g., a fraud detection operation).

Example Guest Rider Threshold Determination Process

Figure 6:
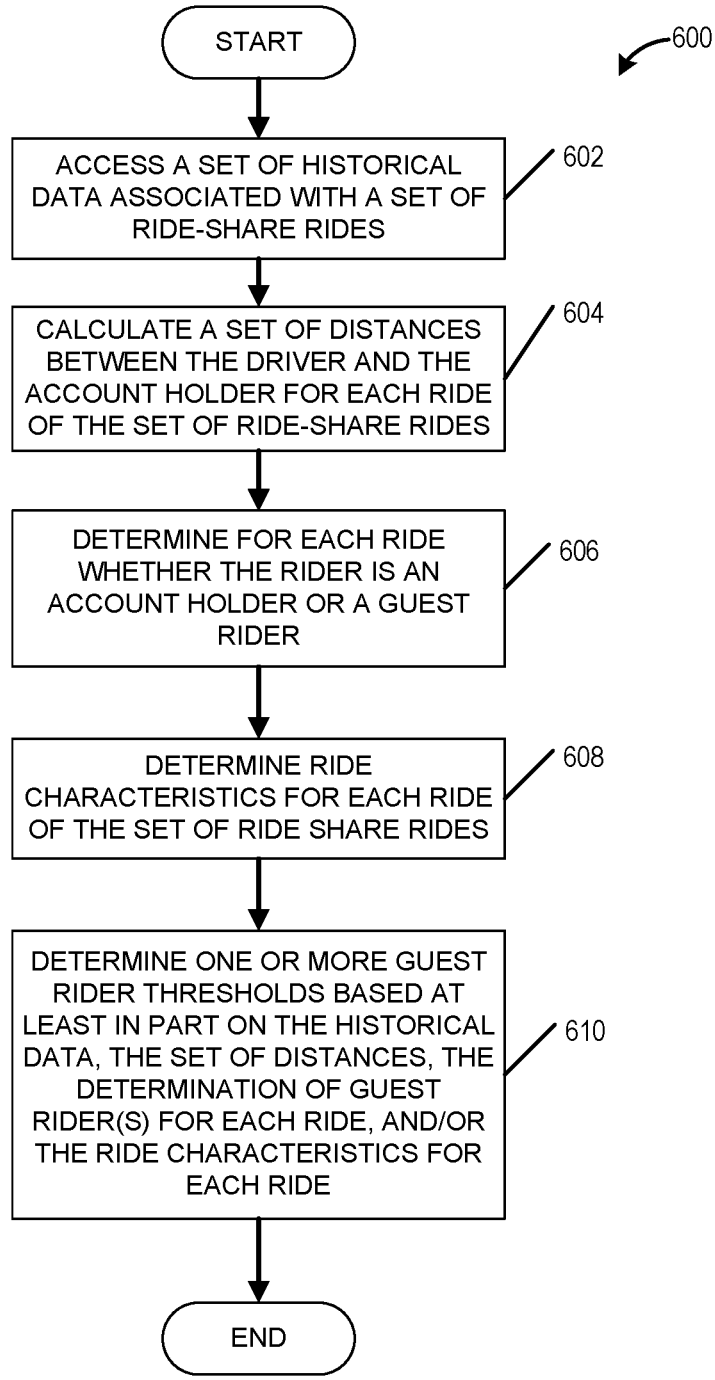
FIG. 6 presents a flowchart of an example guest rider threshold determination process in accordance with certain embodiments.

FIG. 6 presents a flowchart of an example guest rider threshold determination process in accordance with certain embodiments. The process 600 can be implemented by any system that can determine one or more distance thresholds useable in determining and/or predicting whether a rider is an account holder that requested a rider or a guest rider. The process 600, in whole or in part, can be implemented by, for example, a server 130, a ride scheduler 218, a guest rider detector 220, a distance prediction system 222, an intervention system 224, a geolocation system 210, a user device 102, a model generation system 208, or a ride-sharing application 202, among others. Although any number of systems, in whole or in part, can implement the process 600, to simplify discussion, the process 600 will be described with respect to particular systems.

The process 600 may begin at block 602 where, for example, the distance prediction system 222 accesses a set of historical data 230 associated with a set of ride-share rides. The historical data 230 may be accessed from the data store 150. Further, the historical data 230 may include any type of data that may be used to determine distance thresholds. For example, this data may include, for one or more of the ride-share rides included in the historical data 230, a pickup location, a drop off location, one or more locations of the account holder during the ride-share process 400, whether the rider was a guest rider, time of day for the ride, day of the week that the ride occurred, whether the ride was pre-scheduled, whether the ride was requested at the time the ride is desired, identity of places (e.g., real estate, buildings, business, entertainment, etc.) located within a particular distance of the pickup and/or drop off locations, traffic along the route including at the pickup or drop off locations, walkability scores or ratings around the pickup or drop off locations, or any other information that may help determine distance thresholds.

At block 604, the distance prediction system 222 calculates a set of distances between the rider and the account holder for each ride of the set of ride share rides. In some cases, the set of distances are included as part of the historical data 230. In some such cases, the block 604 may be omitted or optional. Alternatively, or in addition, the block 604 may include accessing or obtaining the set of distances accessed from the set of historical data 230. The set of distances may include any of the set of distances identified in Table 1. The block 604 may include calculating a distance for each stage of the process 400 (or alternative ride-sharing processes). Further, the block 604 may include calculating multiple distances for at least some stages of the process 400. For example, a distance may be calculated for each time unit (e.g., minutes, 5 minutes, quarter hours, etc.) and/or distance unit (e.g., meters, miles, kilometers, etc.) of the ride or of each ride of the set of rides.

At block 606, the distance prediction system 222 determines for each ride whether the rider is an account holder or a guest rider. An indication of whether the rider is an account holder or a guest rider may be included as part of the historical data 230. Alternatively or in addition, the determination of whether the rider is an account holder or a guest rider may be based on performance of the process 500. In some cases, the block 606 may include determining the type of guest rider. There may be any number of types of guest riders based on, for example, the relationship between the guest rider and the account holder, the location of the guest rider relative to the account holder at different stages of the ride, and/or a business relationship between the guest rider and the account holder (e.g., whether the guest rider is a customer of the account holder, or whether the account holder provides contracted services to a business for which the guest rider is a customer, etc.). For example, as previously described, the guest riders may be of the get type, the send type, or the agent type. The type of guest rider may be included in the historical data 230 or may be determined using the historical data 230 and one or more rules for identifying a type of guest rider, such as the rules identified in Table 2.

At block 608, the distance prediction system 222 determines ride characteristics for each ride of the set of ride share rides. The ride characteristics may be determined from the historical data 230 accessed at the block 602. The ride characteristics may include any characteristics of the ride that may impact how far a user might be willing to walk for a scheduled ride-share ride. These ride share characteristics may relate to the ride itself, the locations that are part of the ride itinerary (e.g., pickup location, drop off location, location of the account holder, etc.), the timing of the ride, and/or the account holder. For example, the ride share characteristics may include time of day, day of week, traffic, navigability of a location, walkability of a location, safety of a location, culture as it pertains to how far an average person might walk to reach a location, account holder gender, account holder age, past use of the ride-sharing application (e.g., frequency of use, frequency that the account is used for a guest rider, etc.) and the like.

At block 610, the distance prediction system 222 determines one or more guest rider thresholds based at least in part on the historical data 230, the set of distances, the determination of whether guest rider(s) were included for each ride, and/or the ride characteristics for each ride. The one or more guest rider thresholds may indicate a distance at which a rider is determined or predicted to be a guest rider (or the account holder) with a particular degree of certainty. For example, the guest rider threshold may indicate that a rider is likely a guest rider if a distance between the account holder and a pickup location is more than 0.5 miles at a time of pickup. In some cases, multiple guest rider thresholds are determined for varying ride characteristics. For example, one guest rider threshold may be determining for the daytime, one for the evening, and one for night. As another example, different guest rider threshold may be determined for weekdays and weekends. Similarly, different guest rider thresholds may be determined for areas and/or times with more traffic (where, for example, it may be less safe to walk a particular distance) verses areas with less traffic (where, for example, it may be more safe to walk the particular distance). Further, different guest rider thresholds may be determined for different rules or portions of the rules identified in Table 2. Moreover, different guest rider thresholds may be used for different stages of the ride-share process 400 to determine whether a rider is the account holder or a guest rider. Additionally, different guest rider thresholds may be used to determine different types of guest riders. For example, one guest rider threshold may be used at a particular stage of the ride-share process 400 to identify a get or send type guest rider, and another guest rider threshold may be used to determine an agent type guest rider.

In some cases, one or more of the historical data 230, the set of distances, the determination of whether guest rider(s) were included for each ride, and/or the ride characteristics for each ride may be provided to a model generation system 208. The model generation system 208 may use one or more machine learning algorithms to generate a machine learning model. This machine learning model may be a parameter model or prediction model that may be used to predict one or more guest rider thresholds that may be used to determine or predict whether a rider is a guest rider or the account holder using one or more distance or comparison rules, such as the rules of Table 2. In some cases, the block 610 may include generating the prediction model using the historical data instead of or in addition to determining the one or more guest rider thresholds. In other words, the block 610 may use the historical data 230 as training data to generate or modify a prediction model generated using one or more machine learning algorithms.

In some embodiments, the process 600 may include a manual checking or confirmation process. For example, a user (such as an administrator) may confirm that the identity of the guest rider in the historical data 230 is accurate or that the ride characteristics are correctly identified. As another example, the user may confirm that the guest rider thresholds are logical or accurately identified given the provided historical data 230. Thus, in some cases, the machine learning model generation may be an at least partially supervised machine learning process.

Example Ride-Specific Guest Rider Detection Process

Figure 7:
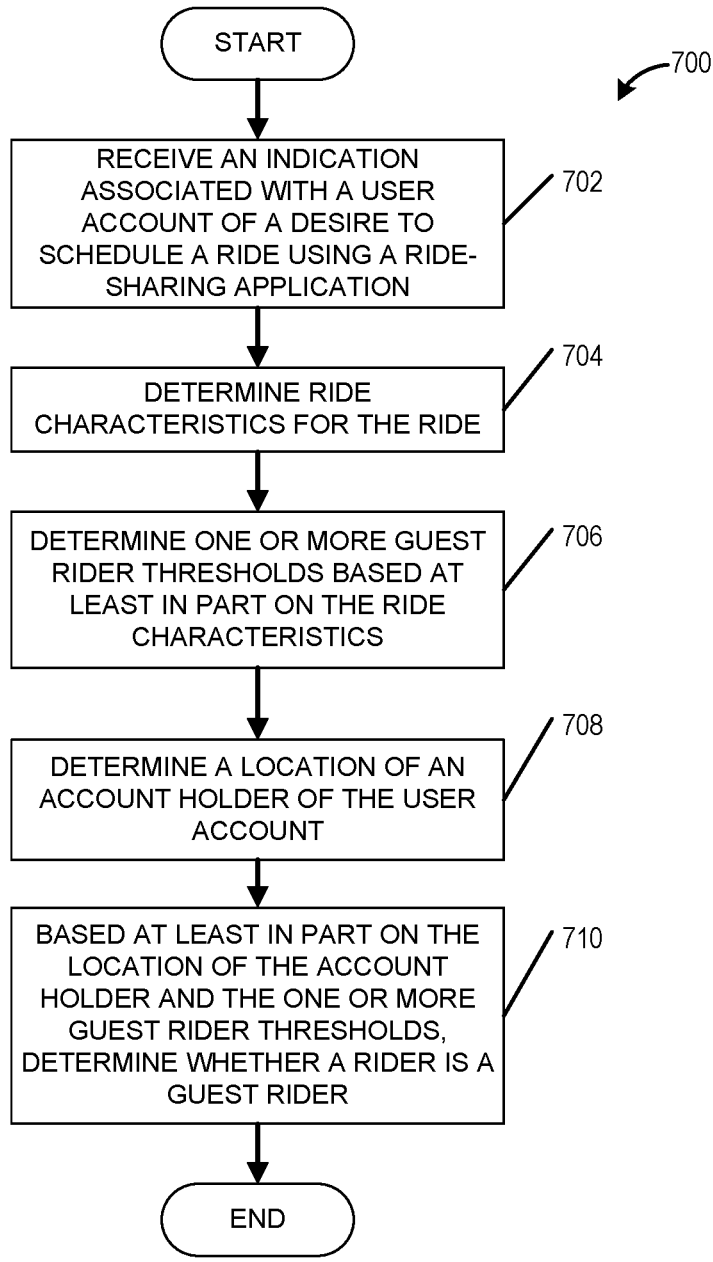
FIG. 7 presents a flowchart of an example ride-specific guest rider detection process in accordance with certain embodiments.

FIG. 7 presents a flowchart of an example ride-specific guest rider detection process 700 in accordance with certain embodiments. The process 700 can be implemented by any system that can identify, determine, or predict with a particular degree of certainty that a rider is a guest rider as opposed to an account holder whose account was used to request the ride for the rider based at least in part on characteristics of the ride and/or account holder. The process 700, in whole or in part, can be implemented by, for example, a server 130, a ride scheduler 218, a guest rider detector 220, a distance prediction system 222, an intervention system 224, a geolocation system 210, a user device 102, a model generation system 208, or a ride-sharing application 202, among others. Although any number of systems, in whole or in part, can implement the process 700, to simplify discussion, the process 700 will be described with respect to particular systems.

The process 700 may begin at block 702 where, for example, the ride scheduler 218 receives an indication associated with a user account of a desire to schedule a ride using a ride-sharing service. This ride sharing service may be associated with a ride-sharing application 202 from which the ride scheduler 218 receives the indication. In some embodiments, the block 702 may include one or more of the embodiments previously described with respect to the block 502.

At block 704, the distance prediction system 222 determines one or more ride characteristics for the ride. In some embodiments, the block 704 may include one or more of the embodiments previously described with respect to the block 608. The ride characteristics may include any of the previously described ride characteristics that may be associated with a location and/or a user account. The ride characteristics may be determined based at least in part on the ride request (e.g., pickup location, drop off location, time of ride, etc.), the user account (e.g., gender of account holder, payment instrument, frequency of use for guest riders, corporate account, etc.), or other internal and/or third-party services or databases (e.g., traffic patterns, walkability data, nearby businesses information, etc.).

At block 706, the distance prediction system 222 determines one or more guest rider thresholds based at least in part on the ride characteristics. Determining the one or more guest rider thresholds may include applying the guest rider characteristics to a machine learning model, such as a machine learning model determined using the process 600. In some cases, the one or more guest rider thresholds determined at the block 706 may be guest rider thresholds that are used to determine whether a particular distance between the account holder and a location (e.g., pickup location, driver location, drop off location, etc.) is indicative of whether the account holder is taking the requested ride or whether the ride was requested for another user, a guest rider.

At block 708, the guest rider detector 220 determines a location of an account holder associated with the user account. In some embodiments, the block 708 may include one or more of the embodiments previously described with respect to the block 508. The operations associated with the block 708 may be performed repeatedly over time. For example, the location of the account holder may be determined at each stage of the ride-sharing process 400, every particular unit of time, during each mile or other unit of distance of the trip, etc. The location of the account holder may be determined using a geolocation system 210 (e.g., a global positioning system) of a user device 102.

At block 710, the guest rider detector 220 determines, based at least in part on the location of the account holder and the one or more guest rider thresholds, whether a rider is a guest rider. In some embodiments, the block 710 may include one or more of the embodiments described with respect to the decision block 510. Determining whether the rider is the guest rider may include comparing the location of the account holder to one or more locations identified in the ride request, one or more locations along the ride route, and/or one or more locations associated with the selected driver. Moreover, the comparison of the locations may include determining a difference in or a distance between the locations. This distance may be compared to the one or more guest rider thresholds to determine whether the rider is or is likely to be the account holder or a guest rider. Further, the determination of whether the rider is the account holder or the guest rider may be based on one or more of the rules identified in Table 2 using one or more of the distances identified in Table 1. In cases where the distance exceeds a guest rider threshold, it may be determined that the rider is a guest rider. In cases where the distance does not exceed the guest rider threshold, it may be determined that the rider is the account holder.

In some embodiments, the block 710 includes determining the type of guest rider. Generally, as described above, the determination of whether the distance does or does not exceed the guest rider threshold may indicate whether the rider is the account holder or the guest rider. However, in some cases, such as when it is established that the rider is a guest rider, the determination of whether the distance is more or less than the guest rider threshold may be used to determine the type of guest rider instead of or in addition to determining whether the rider is a guest rider. For example, for a get type guest rider, a determination that the distance is less than a guest rider threshold may indicate that the guest rider is a get type guest rider as opposed to, for example, a send type guest rider. The type of guest rider may be determined as part of determining whether the rider is a guest rider. Alternatively, or in addition, the type of guest rider is determined upon determining that the rider is a guest rider and/or upon determining that the rider is not the account holder. In some implementations, the determination of whether a rider is a guest rider and/or whether a rider is an account holder may be based on a prediction from a machine learning algorithm.

The process 700 may further include performing one or more of the operations associated with the process 500. For example, if it is determined that the rider is a guest rider, the process 700 may include performing one or more of the operations associated with the blocks 514 and/or 516. Advantageously, in certain embodiments, the ability to determine whether a rider is a guest rider and to modify selection of a driver based on the determination enables improved safety. For example, guest riders may be assigned drivers with higher safety ratings, or who are male or female based on particular ride characteristics. For example, in particular geolocations or at particular times, a rider may have an improved sense of safety with a male driver. In other locations or at other times, a rider may have an improved sense of safety with a female driver. The determination of the type of driver that may improve a sense of safety for a rider may be based on the application of historical data to one or more machine learning algorithms.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, operations associated with the blocks 504, 506, and 508 may be performed in a different order or at least partially in parallel. Further, as another example, elements of the process 500 may be performed by systems of the server 130 or the ride-sharing application 202 hosted by the user device 102.

Example Embodiments

Some example enumerated embodiments are recited in this section in the form of methods, systems, and non-transitory computer-readable media, without limitation.

Certain aspects of the present disclosure relate to a computer-implemented method of detecting a guest rider using a ride-sharing service. The computer-implemented method may be implemented by an interactive computing system comprising one or more hardware processors and configured with specific computer-executable instructions. The computer-implemented method may include: receiving an indication associated with a user account of a ride-sharing service to schedule a ride; determining a pickup location to pick up a rider to start the ride; determining a drop off location to drop off the rider to end the ride; determining a location of an account holder associated with the user account; determining, based at least in part on the location of the account holder and one or more of the pickup location or the drop off location, that the rider is a guest rider, wherein the guest rider is a rider not associated with the user account; and in response to determining that the rider is a guest rider, triggering performance of a guest rider action, wherein the guest rider action corresponds to an action that is omitted when the rider is the account holder.

The method of the preceding paragraph can include any combination or sub-combination of the following features: where the method further includes: determining, based at least in part on the location of the account holder and one or more of the pickup location or the drop off location, a guest rider type of the guest rider; and selecting the guest rider action from a plurality of guest rider actions based at least in part on the guest rider type; where the guest rider type comprises one of a send rider type, a get rider type, or an agent rider type; wherein the send rider type corresponds to when the guest rider and the account holder are at the pickup location when the ride starts send rider type comprises, where the get rider type corresponds to when the guest rider and the account holder are at the drop off location when the ride ends, and the account holder is not at the pickup location when the ride starts, and wherein the agent rider type corresponds to when the account holder is not at the pickup location when the ride starts and the account holder is not at the drop off location when the ride ends; where determining that the rider is the guest rider comprises comparing the location of the account holder to one or more of the pickup location, the drop off location, or a driver location of a driver selected to perform the ride; where determining that the rider is the guest rider comprises comparing a distance between the location of the account holder to the pickup location and a distance between a driver location of a driver selected to perform the ride and the pickup location; where determining that the rider is the guest rider comprises determining that a difference between the location of the account holder and the pickup location, the drop off location, or a driver location of a driver selected to perform the ride exceeds a threshold difference; where the threshold difference is determined based on one or more ride characteristics of the ride; where the location of the account holder is determined based at least in part on a geolocation signal received at a wireless device of the account holder; where the method further includes receiving an indication of the location of the account holder from a wireless device of the account holder; where the guest rider action comprises a fraud detection process; where the guest rider action comprises selection of a driver associated with a threshold safety prediction level; and where the guest rider action comprises selection of a driver with one or more particular characteristics.

Other aspects of the present disclosure relate to a system configured to detect a guest rider using a ride-sharing service. The system may include a non-volatile storage configured to store user data of account holders registered with the ride-sharing service. Further, the system may include a hardware processor of an interactive computing system in communication with the non-volatile storage. The hardware processor may be configured to execute specific computer-executable instructions to at least: receive an indication associated with a user account of the ride-sharing service to schedule a ride; determine a pickup location to pick up a rider to start the ride; determine a drop off location to drop off the rider to end the ride; determine a location of an account holder associated with the user account; determine, based at least in part on the location of the account holder and one or more of the pickup location or the drop off location, that the rider is a guest rider, wherein the guest rider is a rider not associated with the user account; and in response to determining that the rider is a guest rider, trigger performance of a guest rider action, wherein the guest rider action corresponds to an action that is specific to determination that the rider is the guest rider.

The system of the preceding paragraph can include any combination or sub-combination of the following features: where the hardware processor is further configured to execute specific computer-executable instructions to at least: determine, based at least in part on the location of the account holder and one or more of the pickup location or the drop off location, a guest rider type of the guest rider; and select the guest rider action from a plurality of guest rider actions based at least in part on the guest rider type; where the guest rider type comprises a send rider type, a get rider type, or an agent rider type, where the send rider type corresponds to when the guest rider and the account holder are at the pickup location when the ride starts send rider type comprises, where the get rider type corresponds to when the guest rider and the account holder are at the drop off location when the ride ends, and the account holder is not at the pickup location when the ride starts, and where the agent rider type corresponds to when the account holder is not at the pickup location when the ride starts and the account holder is not at the drop off location when the ride ends; where the hardware processor is further configured to determine that the rider is the guest rider by executing specific computer-executable instructions to at least compare the location of the account holder to one or more of the pickup location, the drop off location, or a driver location of a driver selected to perform the ride; where the hardware processor is further configured to determine that the rider is the guest rider by executing specific computer-executable instructions to at least determine that a difference between the location of the account holder and the pickup location, the drop off location, or a driver location of a driver selected to perform the ride exceeds a threshold difference; where the hardware processor is further configured to execute specific computer-executable instructions to at least: determine one or more ride characteristics of the ride; and determine the threshold difference based on the one or more ride characteristics; and where the guest rider action corresponds to one or more of a fraud detection process, selection of a driver associated with a threshold safety prediction level, or selection of a driver with one or more driver characteristics.

Certain aspects of the present disclosure relate to a computer-implemented method of determining a guest rider threshold associated with detecting a guest rider using a ride-sharing service. The computer-implemented method may be implemented by an interactive computing system comprising one or more hardware processors and configured with specific computer-executable instructions. The computer-implemented method may include: accessing a set of historical data associated with a set of rides scheduled via the ride-sharing service, wherein the historical data comprises, for each ride of the set of rides, a set of locations of a driver that performed the ride and an account holder whose account was used to request the ride; calculating a set of distances between the driver and the account holder for each ride of the set of rides based on the set of locations of the driver and the account holder for the ride; determining, based at least in part on the set of historical data, whether the rider is the account holder or a guest rider for each ride of the set of rides; determining, based at least in part on the set of distances and an indication as to whether the rider is the account holder or the guest rider for each ride of the set of rides, a guest rider threshold corresponding to a threshold distance useable to determine whether a requested ride is for an account holder user or a guest rider user; receiving an indication associated with a first user account of a request to schedule a first ride using the ride-sharing service; determining a location of a first account holder associated with the first user account; and determining whether a first rider is the first account holder or a first guest rider based at least in part on the location of the first account holder and the guest rider threshold.

The method of the preceding paragraph can include any combination or sub-combination of the following features: where the method further includes determining, based at least in part on the set of historical data, ride characteristics for each ride of the set of rides, wherein determining the guest rider threshold is further based at least in part on the ride characteristics for each ride of the set of rides; where the ride characteristics comprise one or more characteristics relating to a likelihood that a user would exceed a distance from a pickup location of a requested ride at a first time, a drop off location of the requested ride at a second time, or a driver user selected to perform the ride; where the ride characteristics comprise a day, a time of day, a traffic pattern of a geographic location, a walkability score of the geographic location, one or more account holder demographics, a crime rate of the geographic location, or a cultural characteristic associated with peoples residing in the geographic location; where determining the guest rider threshold comprises applying at least the set of distances and the indication as to whether the rider is the account holder or the guest rider for each ride of the set of rides to a machine learning model configured to predict the guest rider threshold; where the guest rider threshold is one of a plurality of guest rider thresholds, and wherein the computer-implemented method further comprises: accessing a ride characteristic of the first ride; and selecting the guest rider threshold from the plurality of guest rider thresholds based at least in part on the ride characteristic; where the method further includes determining a guest rider type when it is determined that the rider is the guest rider; where the guest rider threshold is determined based at least in part on the guest rider type; where the location of the first account holder is determined based at least in part on a geolocation system of a wireless device of the first account holder; where the method further includes initiating performance of a guest rider action responsive to determining that the first rider is the first guest rider; where the guest rider action corresponds to one or more of a fraud detection process, selection of a safe driver associated with a threshold safety prediction level, or selection of a particular driver with one or more driver characteristics; and where the method further includes determining that a second rider is a second account holder based at least in part on a location of the second account holder and the guest rider threshold; and performing at least part of a ride share process corresponding to a request for a second ride without initiating performance of a guest rider action.

Other aspects of the present disclosure relate to a system configured to determine a guest rider threshold associated with detecting a guest rider using a ride-sharing service. The system may include a non-volatile storage configured to store a set of historical data associated with a set of rides scheduled via the ride-sharing service. Further, the system may include a hardware processor of an interactive computing system in communication with the non-volatile storage. The hardware processor may be configured to execute specific computer-executable instructions to at least: access the set of historical data from the non-volatile storage, wherein the historical data comprises, for each ride of the set of rides, a set of locations of a driver that performed the ride and an account holder whose account was used to request the ride; calculate a set of distances between the driver and the account holder for each ride of the set of rides based on the set of locations of the driver and the account holder for the ride; determine, based at least in part on the set of historical data, whether the rider is the account holder or a guest rider for each ride of the set of rides; determine, based at least in part on the set of distances and an indication as to whether the rider is the account holder or the guest rider for each ride of the set of rides, a guest rider threshold corresponding to a threshold distance useable to determine whether a requested ride is for an account holder user or a guest rider user; receive an indication associated with a first user account of a request to schedule a first ride using the ride-sharing service; determine a location of a first account holder associated with the first user account; and determine whether a first rider is the first account holder or a first guest rider based at least in part on the location of the first account holder and the guest rider threshold.

The system of the preceding paragraph can include any combination or sub-combination of the following features: where the hardware processor is further configured to execute specific computer-executable instructions to at least determine, based at least in part on the set of historical data, ride characteristics for each ride of the set of rides, wherein determining the guest rider threshold is further based at least in part on the ride characteristics for each ride of the set of rides; where the hardware processor is further configured to execute specific computer-executable instructions to determine the guest rider threshold by at least applying at least the set of distances and the indication as to whether the rider is the account holder or the guest rider for each ride of the set of rides to a machine learning model configured to predict the guest rider threshold; where the guest rider threshold is one of a plurality of guest rider thresholds, and wherein the hardware processor is further configured to execute specific computer-executable instructions to at least: access a ride characteristic of the first ride; and select the guest rider threshold from the plurality of guest rider thresholds based at least in part on the ride characteristic; where the hardware processor is further configured to execute specific computer-executable instructions to at least determine a guest rider type of the guest rider when it is determined that the rider is the guest rider, and wherein the guest rider threshold is determined based at least in part on the guest rider type; where the location of the first account holder is determined based at least in part on a geolocation system of a wireless device of the first account holder; where the hardware processor is further configured to execute specific computer-executable instructions to at least initiate performance of a guest rider action responsive to determining that the first rider is the first guest rider, wherein the guest rider action comprises one or more of a fraud detection process, selection of a safe driver associated with a threshold safety prediction level, or selection of a particular driver with one or more driver characteristics; and where the hardware processor is further configured to execute specific computer-executable instructions to at least: determine that a second rider is a second account holder based at least in part on a location of the second account holder and the guest rider threshold; and perform at least part of a ride share process corresponding to a request for a second ride without initiating performance of a guest rider action.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of detecting a guest rider using a ride-sharing service, the computer-implemented method comprising:
  as implemented by an interactive computing system comprising one or more hardware processors and configured with specific computer-executable instructions,
    receiving an indication associated with a user account of a ride-sharing service to schedule a ride;
    determining, based on user interaction with a user interface, a pickup location to pick up a rider to start the ride;
    determining, based on the user interaction with the user interface, a drop off location to drop off the rider to end the ride;
    determining automatically, using a geolocation system of a wireless device of an account holder, a location of the account holder associated with the user account;
    determining, based at least in part on one or more ride characteristics and a comparison of the location of the account holder and one or more of the pickup location or the drop off location, that the rider is a guest rider, wherein the guest rider is a rider not associated with the user account and who is undeclared as the rider, wherein the one or more ride characteristics modify a threshold used during the comparison to determine whether the rider is the guest rider; and in response to determining that the rider is a guest rider, triggering performance of a guest rider action comprising one or more of a fraud detection process to confirm authorized access of the user account, a safe driver selection process to select a driver associated with a threshold safety prediction level, or a driver selection process to select a driver with one or more driver characteristics, wherein the guest rider action corresponds to an action that is omitted when the rider is the account holder.

2. The computer-implemented method of claim 1, further comprising:

determining, based at least in part on the location of the account holder and one or more of the pickup location or the drop off location, a guest rider type of the guest rider; and selecting the guest rider action from a plurality of guest rider actions based at least in part on the guest rider type.

3. The computer-implemented method of claim 2, wherein the guest rider type comprises one of a send rider type, a get rider type, or an agent rider type.

4. The computer-implemented method of claim 3, wherein the send rider type corresponds to when the guest rider and the account holder are at the pickup location when the ride starts, wherein the get rider type corresponds to when the guest rider and the account holder are at the drop off location when the ride ends, and the account holder is not at the pickup location when the ride starts, and wherein the agent rider type corresponds to when the account holder is not at the pickup location when the ride starts and the account holder is not at the drop off location when the ride ends.

5. The computer-implemented method of claim 1, wherein determining that the rider is the guest rider comprises comparing the location of the account holder to one or more of the pickup location, the drop off location, or a driver location of a driver selected to perform the ride.

6. The computer-implemented method of claim 1, wherein determining that the rider is the guest rider comprises comparing a distance between the location of the account holder to the pickup location and a distance between a driver location of a driver selected to perform the ride and the pickup location.

7. The computer-implemented method of claim 1, wherein determining that the rider is the guest rider comprises determining that a difference between the location of the account holder and the pickup location, the drop off location, or a driver location of a driver selected to perform the ride exceeds a threshold difference.

8. The computer-implemented method of claim 7, wherein the threshold difference comprises the threshold used during the comparison to determine whether the rider is the guest rider.

9. The computer-implemented method of claim 1, wherein the location of the account holder is determined based at least in part on a geolocation signal received at the wireless device of the account holder.

10. The computer-implemented method of claim 1, further comprising receiving an indication of the location of the account holder from the wireless device of the account holder.

11. The computer-implemented method of claim 1, wherein the one or more ride characteristics comprises one or more of: a characteristic relating to the ride, the account holder, or a predicted rider, wherein the predicted rider is the guest rider.

12. The computer-implemented method of claim 1, wherein the one or more ride characteristics comprises one or more of a time of data, a traffic pattern of a geographic location, a walkability score of the geographic location, an account holder demographic, or a crime rate of the geographic location.

13. A system configured to detect a guest rider using a ride-sharing service, the system comprising:

a non-volatile storage configured to store user data of account holders registered with the ride-sharing service; and a hardware processor of an interactive computing system in communication with the non-volatile storage, the hardware processor configured to execute specific computer-executable instructions to at least:

receive an indication associated with a user account of the ride-sharing service to schedule a ride;

determine, based on user interaction with a user interface, a pickup location to pick up a rider to start the ride;

determine, based on the user interaction with the user interface, a drop off location to drop off the rider to end the ride;

determine automatically, using a geolocation system of a wireless device of an account holder, a location of the account holder associated with the user account;

determine, based at least in part on one or more ride characteristics and a comparison of the location of the account holder and one or more of the pickup location or the drop off location, that the rider is a guest rider, wherein the guest rider is a rider not associated with the user account and who is undeclared as the rider, wherein the one or more ride characteristics modify a threshold used during the comparison to determine whether the rider is the guest rider; and in response to determining that the rider is a guest rider, trigger performance of a guest rider action comprising one or more of a fraud detection process to confirm authorized access of the user account, a safe driver selection process to select a driver associated with a threshold safety prediction level, or a driver selection process to select a driver with one or more driver characteristics, wherein the guest rider action corresponds to an action that is specific to determination that the rider is the guest rider.

14. The system of claim 13, wherein the hardware processor is further configured to execute specific computer-executable instructions to at least:

determine, based at least in part on the location of the account holder and one or more of the pickup location or the drop off location, a guest rider type of the guest rider; and select the guest rider action from a plurality of guest rider actions based at least in part on the guest rider type.

15. The system of claim 14, wherein the guest rider type comprises a send rider type, a get rider type, or an agent rider type, wherein the send rider type corresponds to when the guest rider and the account holder are at the pickup location when the ride starts, wherein the get rider type corresponds to when the guest rider and the account holder are at the drop off location when the ride ends, and the account holder is not at the pickup location when the ride starts, and wherein the agent rider type corresponds to when the account holder is not at the pickup location when the ride starts and the account holder is not at the drop off location when the ride ends.

16. The system of claim 13, wherein the hardware processor is further configured to determine that the rider is the guest rider by executing specific computer-executable instructions to at least compare the location of the account holder to one or more of the pickup location, the drop off location, or a driver location of a driver selected to perform the ride.

17. The system of claim 13, wherein the hardware processor is further configured to determine that the rider is the guest rider by executing specific computer-executable instructions to at least determine that a difference between the location of the account holder and the pickup location, the drop off location, or a driver location of a driver selected to perform the ride exceeds a threshold difference.

18. The system of claim 17, wherein the hardware processor is further configured to execute specific computer-executable instructions to at least determine the one or more ride characteristics of the ride.

19. The system of claim 17, wherein the threshold difference comprises the threshold used during the comparison to determine whether the rider is the guest rider.

20. The system of claim 13, wherein the one or more ride characteristics comprises one or more of: a characteristic relating to the ride, the account holder, or a predicted rider, wherein the predicted rider is the guest rider.

21. The system of claim 13, wherein the one or more ride characteristics comprises one or more of a time of data, a traffic pattern of a geographic location, a walkability score of the geographic location, an account holder demographic, or a crime rate of the geographic location.

* * * * *